(12) United States Patent
Spiro

(10) Patent No.: US 12,063,898 B2
(45) Date of Patent: Aug. 20, 2024

(54) MODULAR VERTICAL CULTIVATION WALL SYSTEM AND A METHOD OF PROVIDING A MODULAR VERTICAL CULTIVATION WALL

(71) Applicant: Urban Planter LLC, Scottsdale, AZ (US)

(72) Inventor: Daniel S. Spiro, Scottsdale, AZ (US)

(73) Assignee: URBAN PLANTER LLC, Scottsdale, AZ (US)

( * ) Notice: Subject to any disclaimer, the term of this patent is extended or adjusted under 35 U.S.C. 154(b) by 281 days.

(21) Appl. No.: 17/750,756

(22) Filed: May 23, 2022

(65) Prior Publication Data
US 2023/0354754 A1   Nov. 9, 2023

(30) Foreign Application Priority Data
May 3, 2022   (EP) .................................... 22171226

(51) Int. Cl.
*A01G 9/00* (2018.01)
*A01G 9/02* (2018.01)
*A01G 27/00* (2006.01)
*A01G 27/02* (2006.01)

(52) U.S. Cl.
CPC .......... *A01G 9/025* (2013.01); *A01G 27/003* (2013.01); *A01G 27/02* (2013.01)

(58) Field of Classification Search
CPC ........ A01G 9/022; A01G 9/023; A01G 9/024; A01G 9/025; A01G 31/00; A01G 31/02; A01G 31/06
See application file for complete search history.

(56) References Cited

U.S. PATENT DOCUMENTS

| | | | | |
|---|---|---|---|---|
| 4,896,456 A | * | 1/1990 | Grant | A01G 9/02 47/67 |
| 5,099,606 A | * | 3/1992 | Koerper | A01G 9/02 47/66 |
| 2010/0095588 A1 | | 4/2010 | Hashimoto | |
| 2011/0094153 A1 | * | 4/2011 | Urriola | A01G 9/02 47/65.7 |
| 2019/0166770 A1 | * | 6/2019 | Sprio | A01G 9/02 |
| 2022/0039327 A9 | | 2/2022 | Spiro | |
| 2022/0330504 A1 | * | 10/2022 | Langille | A01G 31/06 |

FOREIGN PATENT DOCUMENTS

| | | |
|---|---|---|
| KR | 10-1035461 B1 | 5/2011 |
| KR | 10-1255150 B1 | 4/2013 |

OTHER PUBLICATIONS

Extended European search report issued on Oct. 19, 2022, in corresponding European patent Application No. 22171226.8, 9 pages.

* cited by examiner

*Primary Examiner* — Monica L Perry
*Assistant Examiner* — Henry Hooper Mudd
(74) *Attorney, Agent, or Firm* — XSENSUS LLP

(57) ABSTRACT

A modular vertical plant cultivation wall system configured to produce minimal carbon footprint from fabrication through erection, to be built of sustainable material and to be installed rapidly by low skilled labor is provided. The modular vertical cultivation wall system includes at least two vertical posts, at least two planter shelves, at least two endcap walls, and at least one of: a pipe, a seed/plant root retaining matrix, and irrigation fluid. Further, a method of providing a modular vertical cultivation wall is provided.

19 Claims, 17 Drawing Sheets

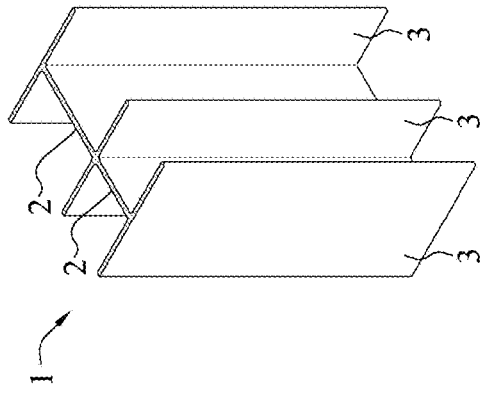
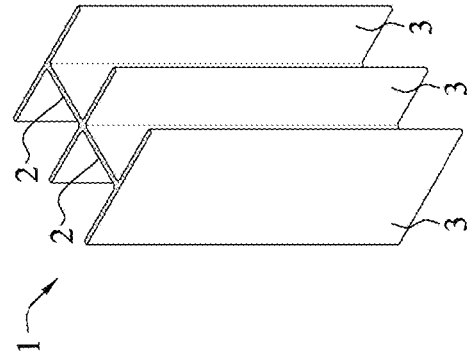
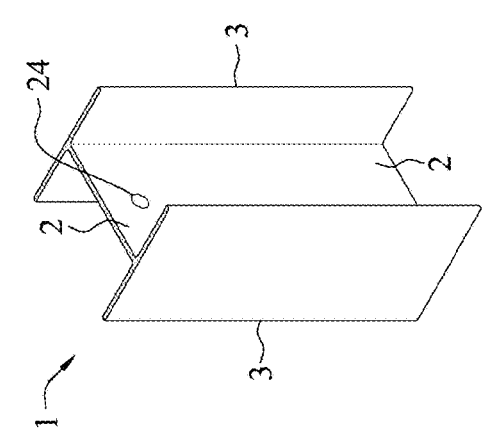
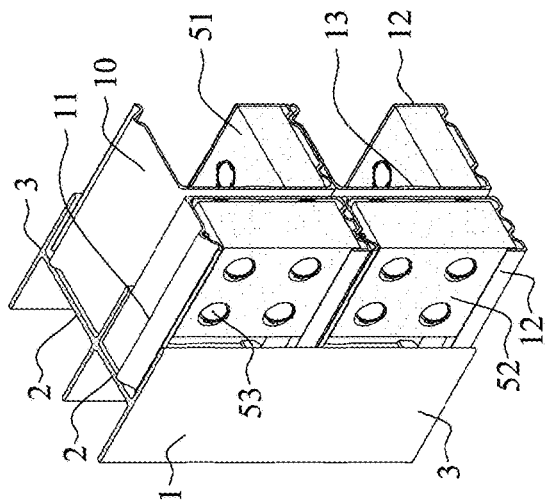
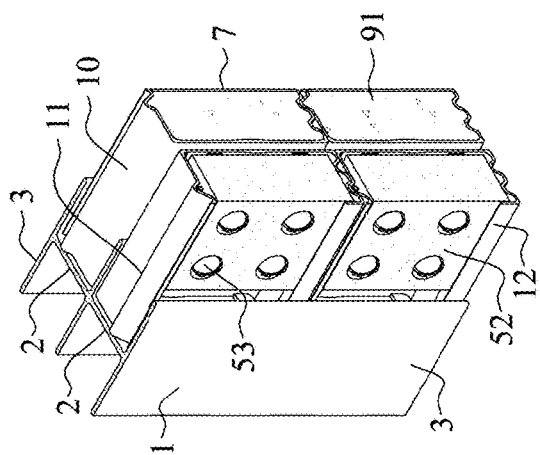
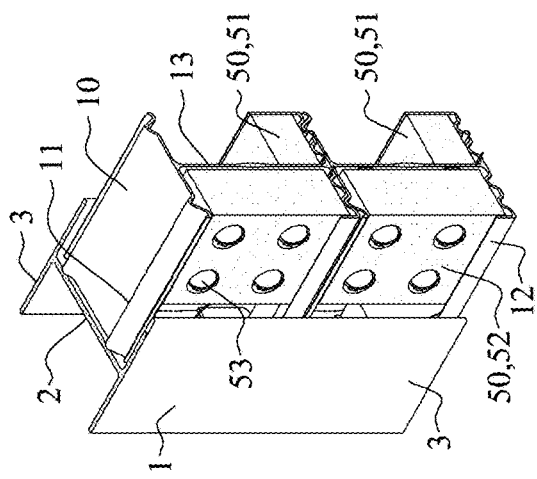

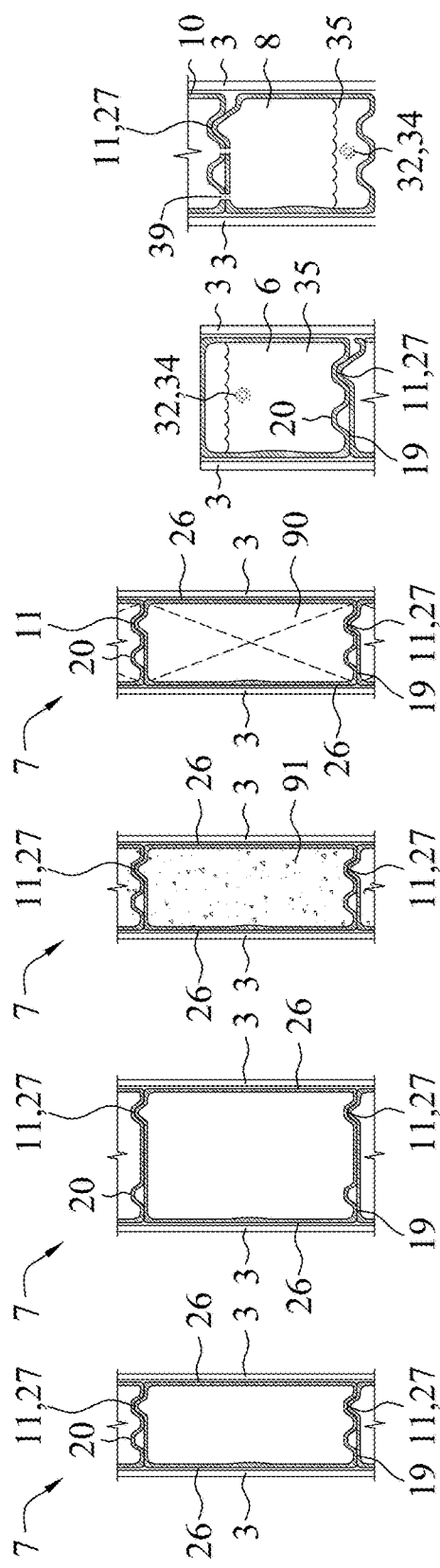
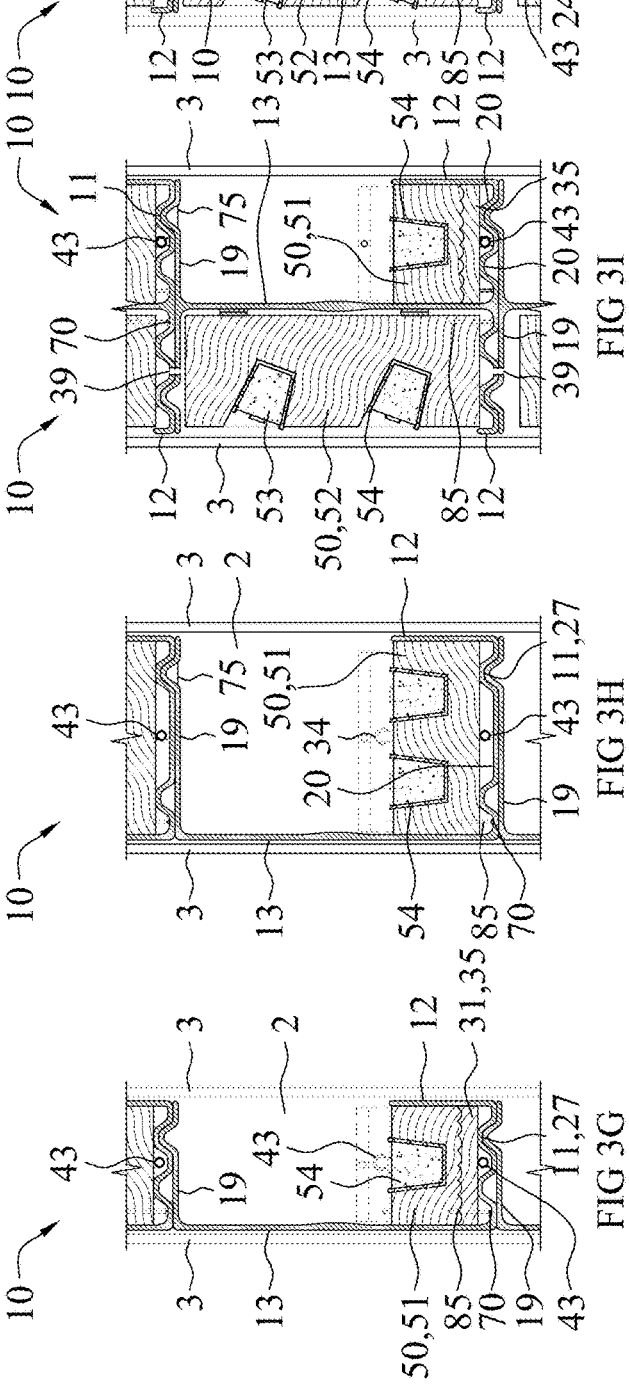

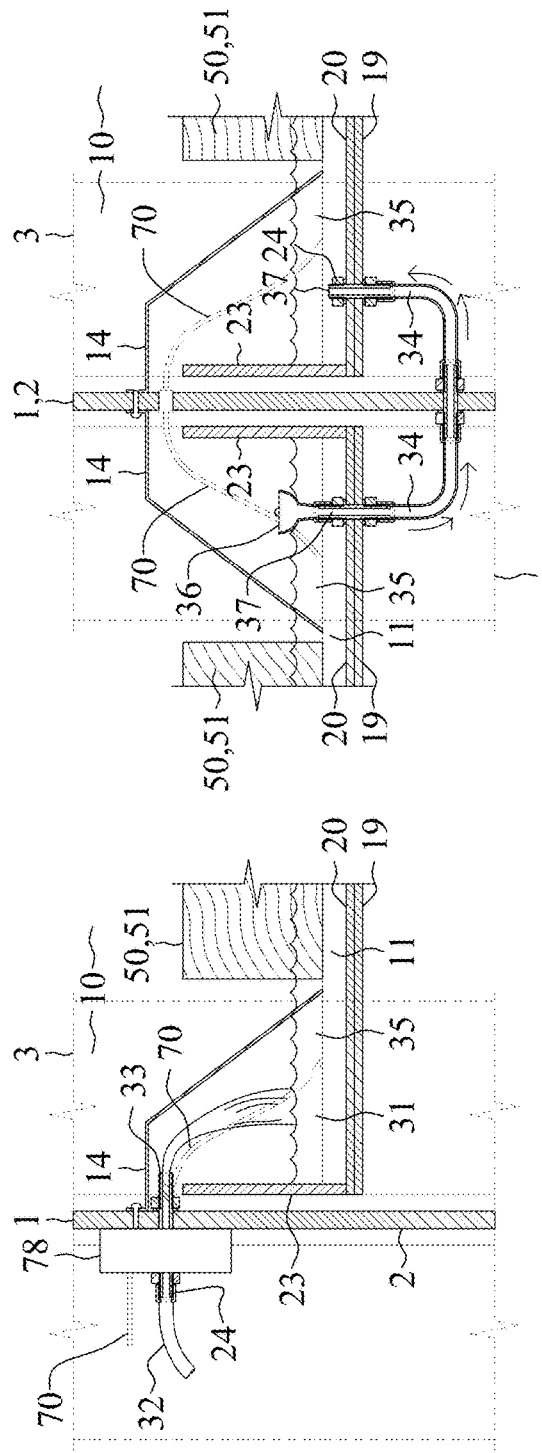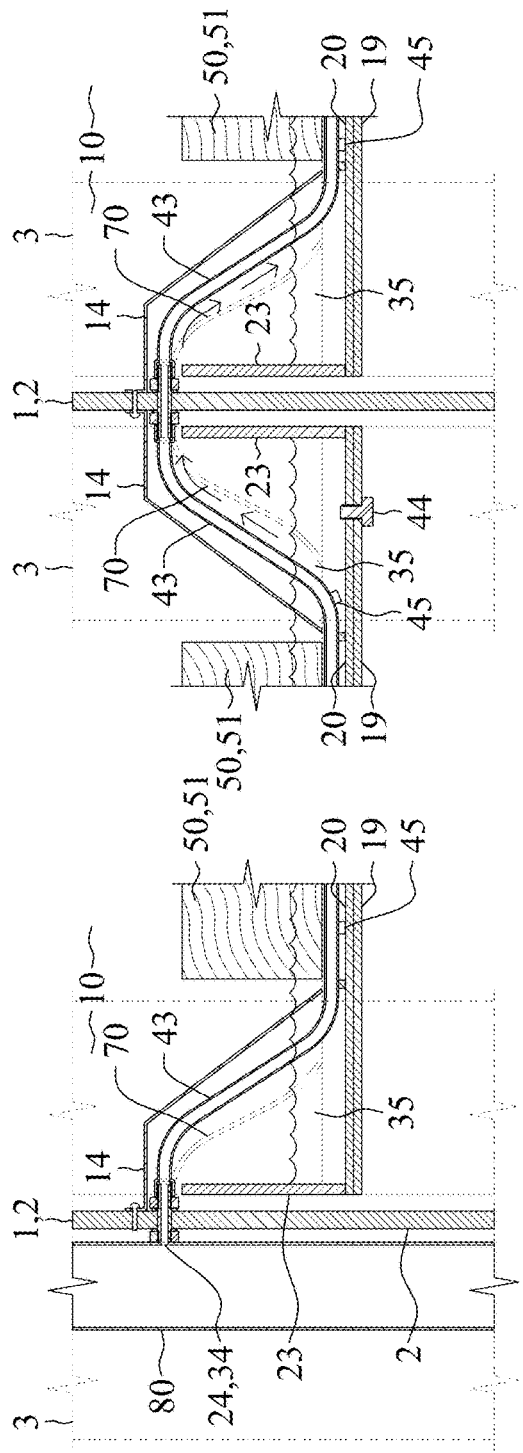

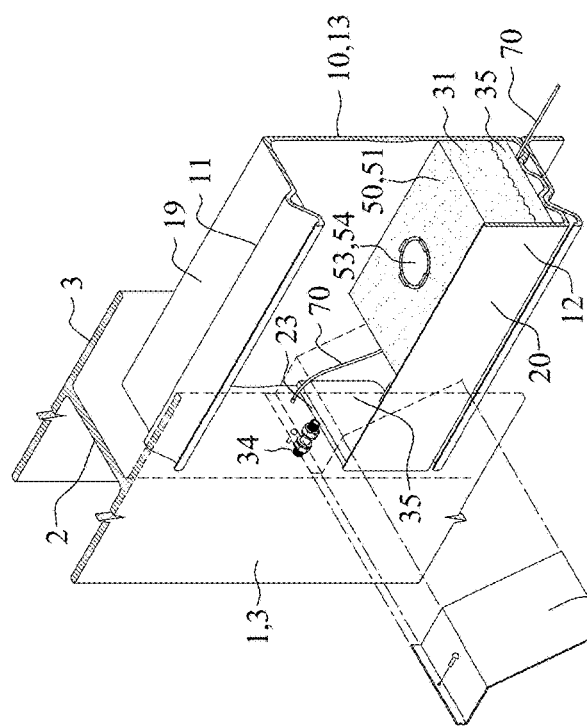
FIG 8C
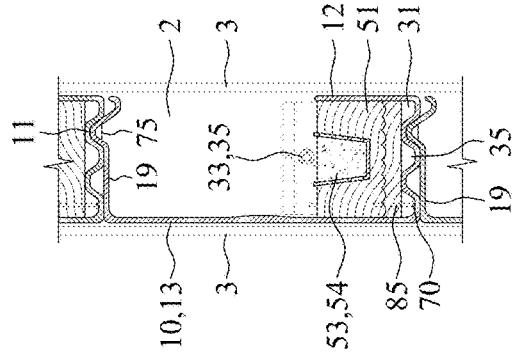
FIG 8B
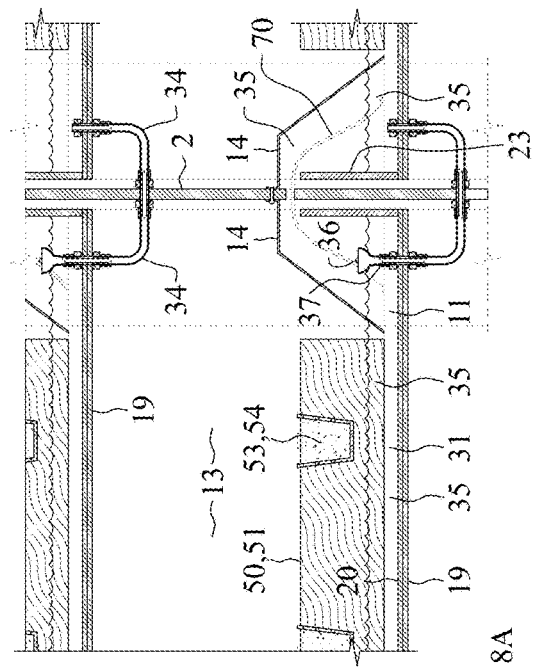
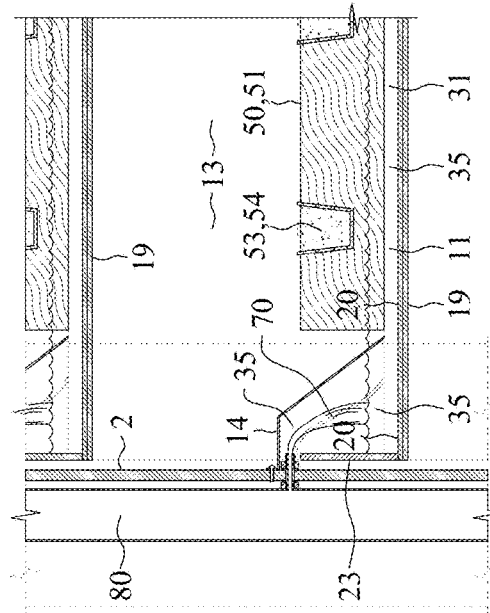
FIG 8A

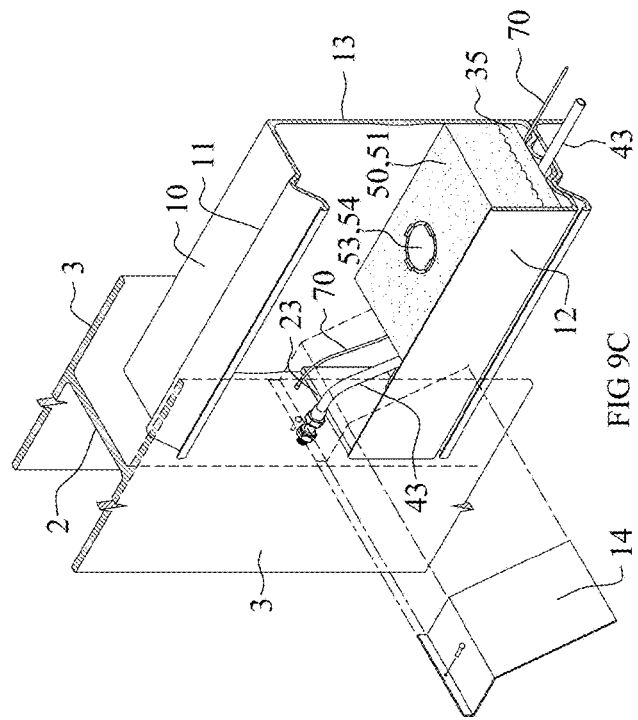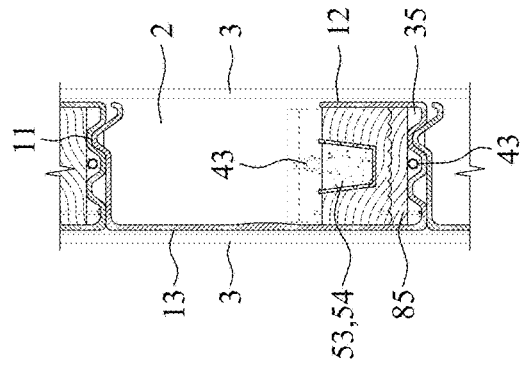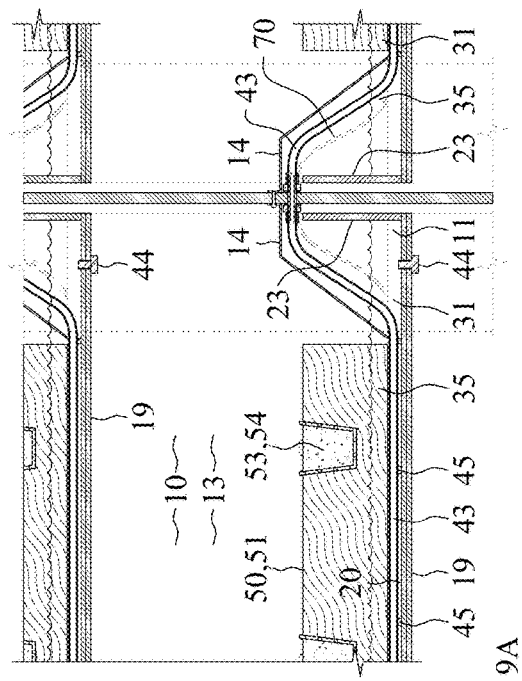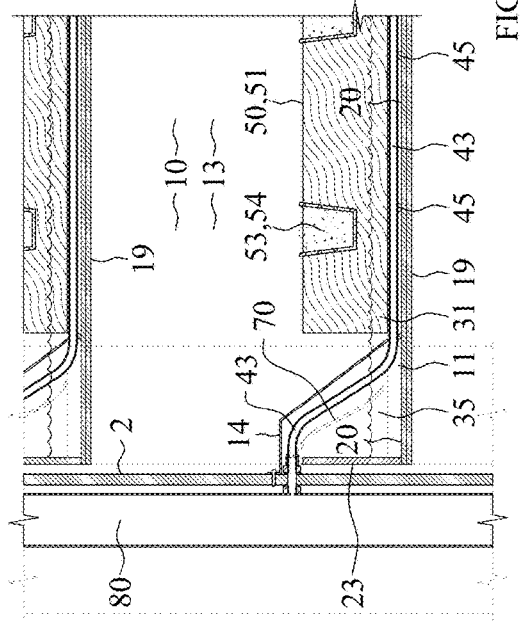

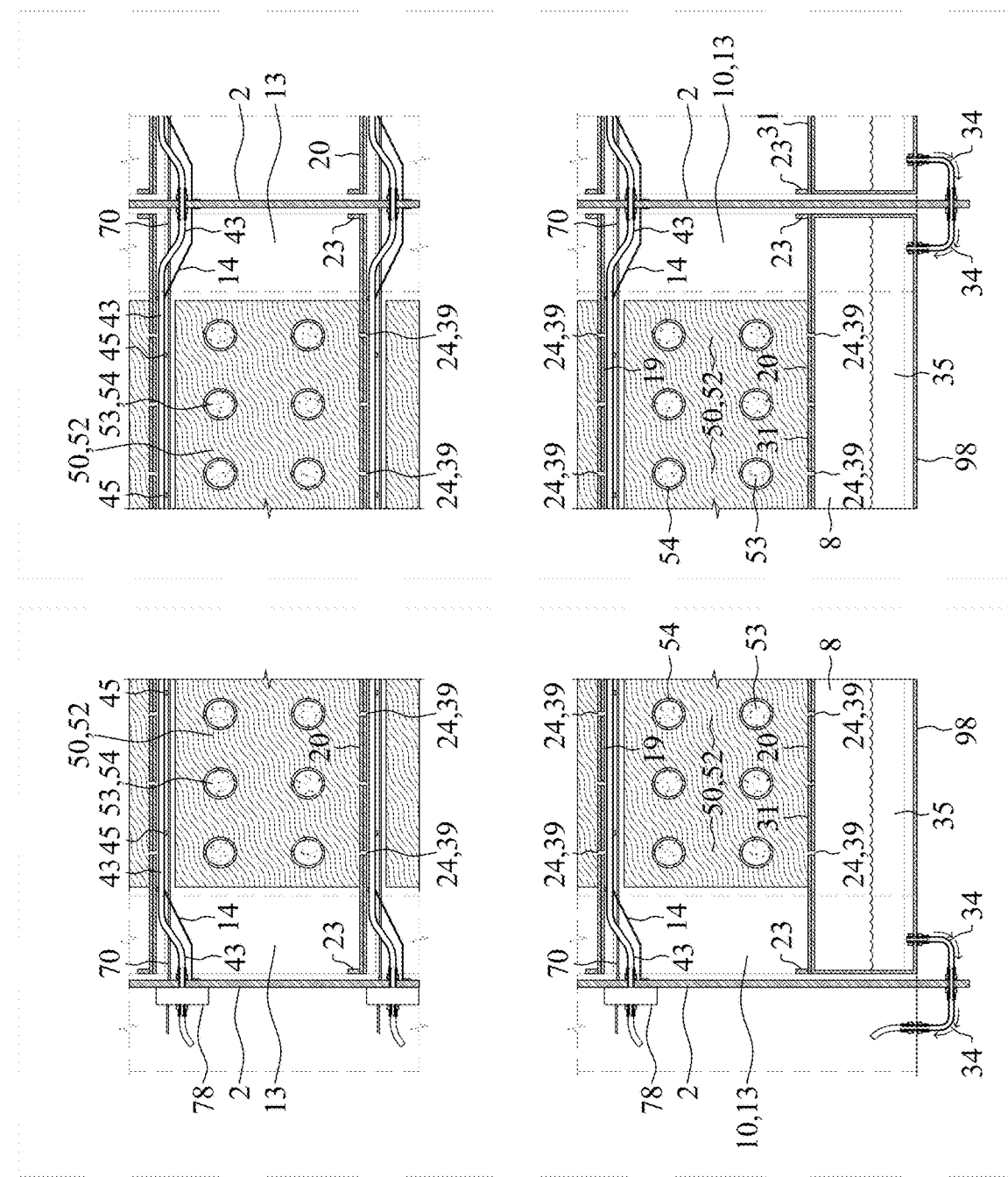

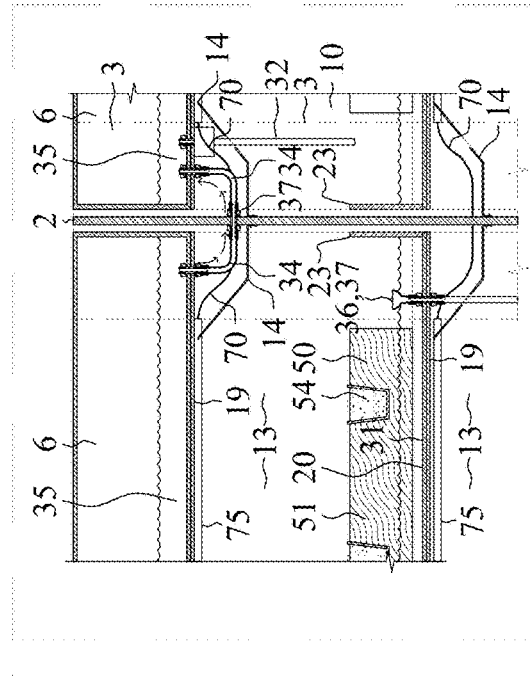
FIG 12C
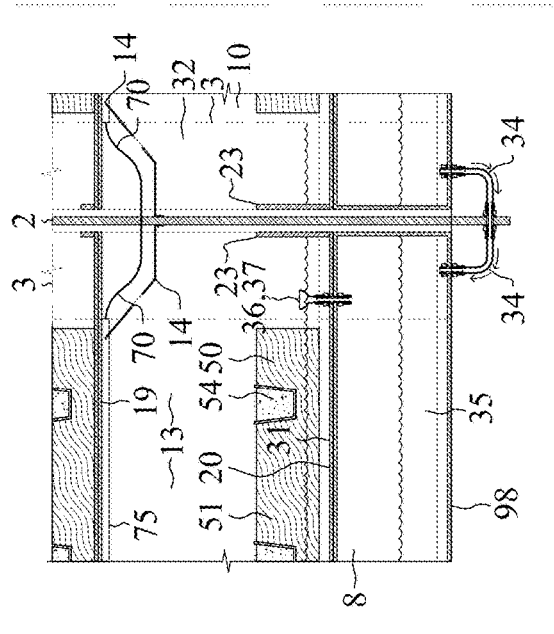
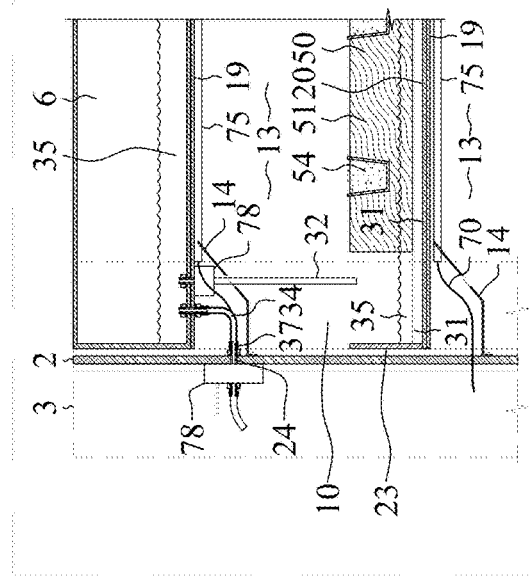
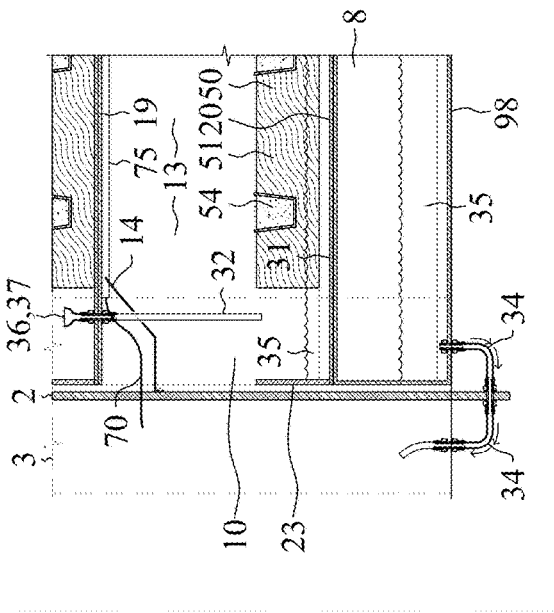
FIG 12D

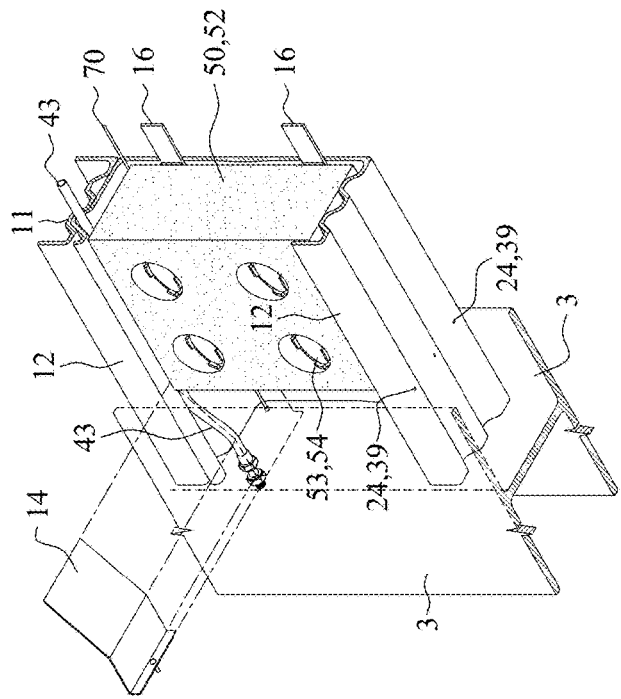
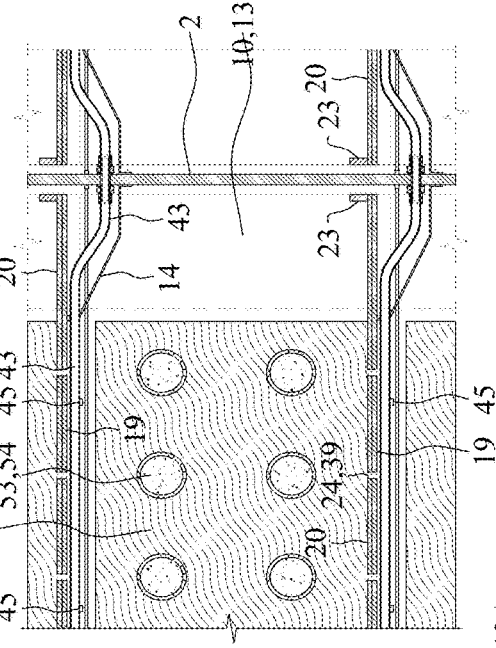
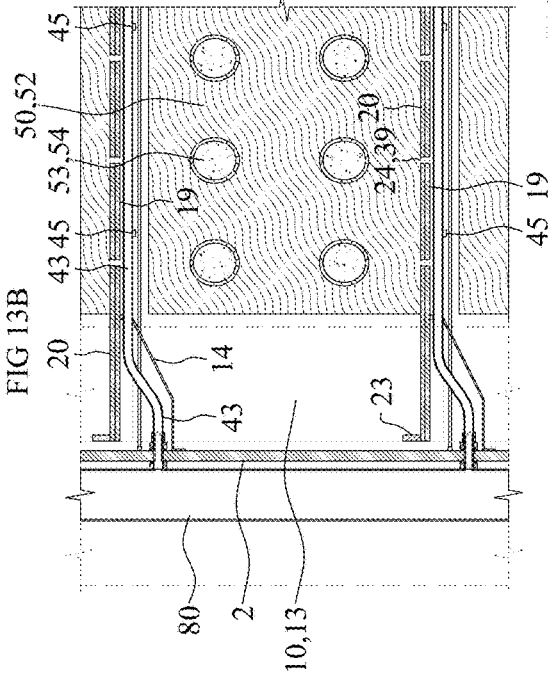

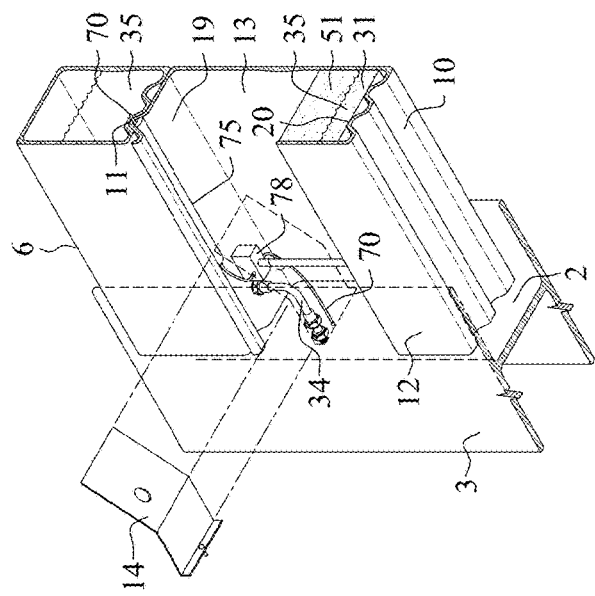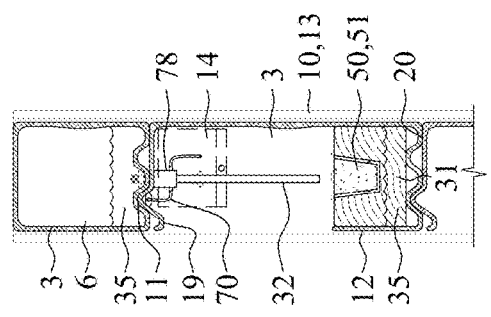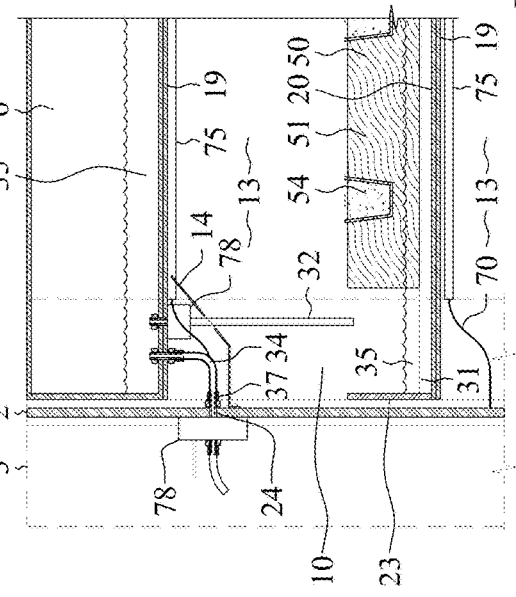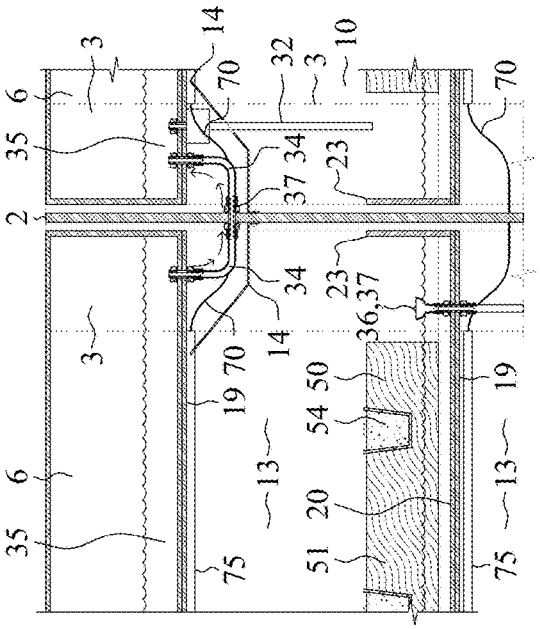

MODULAR VERTICAL CULTIVATION WALL SYSTEM AND A METHOD OF PROVIDING A MODULAR VERTICAL CULTIVATION WALL

CROSS REFERENCE TO RELATED APPLICATION

The present application claims priority to European application EP 22171226.8, filed in the European Patent Office on May 3, 2022, the entire contents of which being incorporated herein by reference.

TECHNICAL FIELD

This invention relates generally to a modular vertical cultivation wall system and to a method of providing a modular vertical cultivation wall.

STATE OF THE ART

It is well known in the art to arrange walls in urban environments, such as along highways and train rails, but also as an alternative to fences around private property or public areas. The walls are typically made of concrete which causes a problem in view of carbon footprint. Also, concrete walls as such have a negative impact on the aesthetical environment and are often covered with graffiti. There is hence a need for other wall solutions that have a reduced carbon footprint, which have positive impact of the aesthetical environment, that are ecologically friendly, and which are easy to install.

SUMMARY OF THE INVENTION

One embodiment includes a modular vertical cultivation wall system comprising: at least two posts, at least two planter shelves, at least two endcap walls, and at least one of: a pipe, a seed/plant root retaining matrix, and irrigation fluid, wherein:
  each post is elongated, vertically anchored to at least one retaining surface and comprises at least one web and at least two flanges;
  each planter shelf is elongated and comprises at least one of: a top wall flange, a bottom wall flange, a full height side wall connecting the top wall flange and the bottom wall flange, and a short side wall;
  the ends of a first horizontally oriented planter shelf are disposed between the at least two flanges of each of the two vertical posts;
  the ends of a second horizontally oriented planter shelf are disposed between the at least two flanges of each of the two vertical posts retaining the first planter shelf, and wherein and the at least two planter shelves are configured to slide downwardly into a position in which the bottom wall flange of the second planter shelf couples with the top wall flange of the first planter shelf by at least one reciprocating mechanical key;
  endcaps' walls coupled to a top surface of the bottom wall flange at both ends of the first and second planter shelves and to their side walls define a fluid irrigation reservoir that is open to the above and with at least one opening to the below; and in which system piped fluid is configured to directly or indirectly flow to a fluid irrigation reservoir of a planter shelf through an opening in a web of one of the vertical posts and exit the fluid irrigation reservoir through at least one opening in a bottom wall of the fluid irrigation reservoir;
  the fluid dispensed is configured to irrigate from above or below at least one seed/plant root retaining matrix that is configured to be coupled to at least one of: a wall defining the fluid irrigation reservoir and a side wall of a planter shelf; and
  the weight of at least two planter shelves alone, or in combination with at least one base panel, wall panel or header panel is configured to be directed to a below retaining surface substantially without applying vertical loads on the at least two posts.

Accordingly, the present innovation is a modular vertical plant cultivation wall system that couples plant material to structural and electromechanical systems. The electromechanical systems coupled to IOT devices provide additional urban infrastructure utility that goes beyond caring for the coupled plant material.

In the event of being made of fibrous glass material, the modular vertical plant cultivation wall has a minimal carbon footprint when compared with other wall product material and especially concrete. Over time, the carbon footprint the wall produces through manufacturing, transport and installation can turn into a net positive.

In one recent study prepared by the University of Warwick, UK, a fibrous wall of the present innovation was evaluated against a concrete barrier 3.0 meters in height and 1.0 km long. The fibrous wall's CO emission was found to be only 0.39 of the concrete wall, saving approximately 406,961 $kgCO_2$ eq from entering the atmosphere. These savings were gained before coupling the wall with plant material.

Therefore, it is understood that while the cultivation wall system's material, means of production, transportation, installation, and maintenance emits carbon oxides and other harmful pollutants into the air, over time plant material coupled to the wall reduces the amount of pollution from the air. It thus acts as a pollution scrubber. That said, over time the wall can turn into a net zero wall or even a net plus carbon footprint wall. In urban settings, green walls have also proven to reduce ambient temperature in the summer, and coupled to buildings, maintain building interior ambient temperatures warmer in the winter.

The present innovation integrates material, construction, irrigation, and control methods with the sole purpose of developing the state of the art, sustainable, and ecologically friendly urban wall. The vertical cultivation wall is modular. The local structural demands to withstand the elements may vary. For that reason, the present innovation modular cultivation wall demonstrates a great ability to withstand wind load forces, corrosive chemical agents, UV radiation, fire, point impact, and slow/ice loads.

For this reason, the modular cultivation wall system is scalable. Further it may be made of fibrous material having high tensile and compressive properties. The fibrous material can be used in forming all the wall elements. These elements can include at least one of: a post, a planter shelf, a header panel, a base panel, or a wall panel. At least one of: the post, the planter shelf, and any of the panels is/are preferably substantially or fully fabricated of material other than metal or cement.

The present innovation wall can be fully non-conductive. The non-conductivity of the wall material is of the utmost importance when a wall is placed in proximity to an electric device generating an electromagnetic field. In urban settings, electromagnetic field generators can include transformers and high-speed trains.

Built as a wall assembly, the posts can withstand substantial lateral and uplift forces, whereas the planter shelves and/or the panels can withstand lateral and cross-lateral forces.

The planter shelves and the wall panels have elongated spans that rest on one another in a stacked manner with keyed mechanical connectors. The planter shelves and the panels distribute their axial loads along their bottom wall flanges. For example, a wall comprising a header panel, several planter shelves, and a base panel, including all plant material and irrigation fluid, uniformly transfers its axial loads linearly along the bottom wall flange of the panels and the planter shelf. Starting from the bottom wall flange of the header panel, the load transfers through the planter shelves to the bottom wall flange of the bottom planter shelf onto the base panel, and from there to the retaining surface below.

The planter shelves' and the panels' longitudinal ends are disposed and retained inside supporting posts located at opposite sides of the planter shelves and panels. At least one of the planter shelves, the panels, and the posts can be formed by the process of pultrusion. The pultruded fibrous planter shelves', panels', and posts' attributes include the ability to receive paint coating, compressive and tensile strength, easy-to-install lightweight material, relatively low cost, and global sourcing availability for the raw material.

The present innovation vertical cultivation wall system is modular. The wall's key components include a post, a base panel, a planter shelf, and a header panel. In an alternate embodiment, the wall may include a chase enclosure that retains at least a portion of an irrigation system.

The chase enclosure can be defined by two chase posts and two side panels, wherein at least one side panel can have an access door. The system modularity eliminates the need for customization, which in turn allows for the same tooling and manufacturing processes to be repeated, reducing the overall carbon footprint with each cycle of production.

All of the present innovation's modular vertical cultivation wall systems are comprised of: at least two posts and one planter shelf. The posts are coupled to a retaining surface and the ends of the elongated planter shelf are disposed and retained in a sliding manner by at least two elongated flanges of each of the two posts. Other elements that can couple to the planter shelf include a header panel, a base panel, a wall panel, and an irrigation system.

The cultivation wall can be single or double-sided. The posts retaining the planter shelves can retain more than one wall system in the same assembly. For example, posts retaining a single-sided planter shelf can be disposed parallel to a sound attenuation wall with the same or different height panels from the height of the planter shelf wall height. The number of flanges the post has can then correspond to the number of retained wall systems, wherein the spacing between the flanges corresponds to the width of the planter shelves or to the planter shelf and the wall panel.

The sustainable properties of the modular vertical cultivation wall system of the present innovation make this green wall suitable across construction industry sectors including residential, commercial, industrial, and utility/governmental markets.

Detailed Description of the Wall Systems and Elements

The Modular Planter Wall System—The modular planter wall plant growing system comprises at least two of: vertically disposed elongated posts and two elongated horizontally disposed planter shelves.

Each of the two posts is configured to be anchored to at least one retaining surface. Each post has at least two flanges extending outwardly from at least one web of the post. The flanges and the at least one web of the post can be unitarily formed, and the posts can extend vertically the full height of the wall.

The planter shelves' transverse cross section profile resembles the letter "C" having an opening to the outside along one of its vertical side walls. The planter shelf comprises two generally horizontal wall flanges, one on top and the other at the bottom, both unitarily coupled to at least one of: a full height vertical side wall and a short vertical side wall. At least one seed and/or plant root retaining matrix is coupled to at least one interior surface of the planter shelf and fluid is configured to reach the seed and/or plant root retaining matrix from above or from below.

At least one of the top or bottom wall flanges of the planter shelf has a mechanical key that is configured to couple to another top or bottom wall flange of a planter shelf disposed from above, below or from above and below. The mechanical key can extend the longitudinal length of the flange. The mechanical key of the planter shelf can also couple to reciprocating mechanical keys of other type panels that the wall can be comprised of. These panels can include at least one of: a header panel, a wall panel, and a base panel. The planter shelf, the panels and the post can be fabricated of fibrous non-corrosive widely available material other than metal or cement.

The modular planter shelf wall is fabricated by anchoring at least two posts to at least one retaining surface and then from above sliding the planter shelf panels one by one over one another until reaching the specified wall height. Thereby a subset of planter shelves is formed. In a different embodiment the process can remain the same; however, the first panel to be placed is a base panel followed by a plurality of planter shelf panels and the process is terminated with placing a header panel on top. The retaining surface may be the ground, but it may also be a vertical wall of e.g. a building or another structure.

To secure the wall assembly against wind uplift forces and theft, the top panel or the top planter shelf may be mechanically secured to the post. The planter shelf wall alone, or in combination with at least one panel, is configured to direct the weight of the wall substantially or fully to a below retaining surface/s without applying axial loads on the posts. Thus, the axial force is transferred to the retaining surface via the lowermost element in the subset of planter shelves and/or panels that are arranged between the posts.

The Post—The post comprises at least one web and at least two flanges. The web and the flanges are unitarily formed. The flanges are positioned substantially perpendicular to the web and can be disposed on at least one side of the web. The post is configured to be anchored to a retaining surface. The retaining surface can be the ground and/or a vertical retaining structure such as a building. In a preferred embodiment, the post is made of non-metallic, non-cement, fibrous material. In other embodiments, the post can be made of metal, cement, and/or other materials.

The post web or the chase post web (in the event the post is part of a chase enclosure) can have at least one through opening. The openings enable at least one of: fluid passage, electrical/data conductor passage, and passage for mechanical connectivity device/s. At least one coupler coupled to the web of the post is configured to couple to fluid, and/or electrical/data conductor/s from both sides of the web.

The Planter Shelf—The planter shelf is a modular elongated structure that is self-supported and configured to grow plant material. The planter shelf longitudinal ends are configured to be disposed between at least two flanges of posts that are anchored to at least one retaining surface at opposite sides of the elongated planter shelf. While the two posts are anchored to at least one retaining surface, the planter shelves are freely removable by sliding along the gap that is formed between the post flanges.

The elongated planter shelf comprises at least one of: a top wall flange, a bottom wall flange, a full height side wall connecting the top wall flange and the bottom wall flange, and a short side wall. The top wall flange, the bottom wall flange, the full height side wall connecting the top wall flange and the bottom wall flange, and the short side wall may together provide the planter shelf with a substantially C-shaped cross section.

When planter shelves are placed on one another, the ends of the first removable planter shelf are disposed between the at least two flanges of each of the two posts. A second removable planter shelf is longitudinally coupled from above to the first planter shelf with its longitudinal ends being disposed between the post flanges retaining the first planter shelf. The first and the second planter shelves are coupled by a longitudinal mechanical key. The mechanical key may be formed by the planter shelves having at least one of a recess and/or a protrusion on at least one of their top wall flanges and bottom wall flanges. The at least one recess and/or protrusion of a first planter shelf is configured to couple to a reciprocating recess and/or a protrusion of another planter shelf/wall panel coupled from below and/or above. The recess and/or protrusion can also be compatible with any other panel type.

Lateral and cross-lateral forces acting on the coupled planter shelves that form a wall are resisted by the posts' flanges. The same resistance is applied when the planter shelves' wall is coupled to other type panels. At least one mechanical fastener coupled to at least one post web and/or flange restrains the planter shelf wall or the planter shelf wall with panels from uplift forces.

The fibrous planter shelf wall profile is thin yet extremely strong. The longitudinal length of the planter shelf is at least 250 times greater than the thickness of the full height side wall of the planter shelf as measured at its narrowest location. The planter shelf or the planter shelf and the post may be made of at least 35% fibrous material. An 8-inch wide, one foot in height planter shelf full height side wall thickness can be as thin at 0.15" at the narrowest location and 0.30" thick at its widest location.

The planter shelf profile is scalable and adaptable to at least four methods of irrigation configurations. Some of the configurations require a planter shelf fluid reservoir while others may require a local header panel or a remote fluid reservoir. Further, in some configurations the fluid flows laterally from one planter shelf to another across a post web, while in another configuration the fluid flows by gravity down through a plurality of planter shelf weep holes to a surface below. The irrigation fluid of the lateral and the vertical circulation methods can be collected and can be re-circulated.

The Wall Irrigation System—Irrigation fluid to the modular vertical plant cultivation wall plants can be delivered from a remote system or an integrated cultivation wall system referred to herein as the irrigation system chase enclosure. The chase irrigation system enclosure is an enclosure that houses at least one device of the vertical cultivation irrigation system.

The irrigation chase enclosure is typically comprised of two chase vertical posts aligned with the cultivation wall and two panels extending across the gap between the two vertical posts at opposing sides of the wall forming the chase enclosure. At least one of the panels can have or can be an access door to the chase's interior. The access door can be configured to be locked with a mechanical and/or an electronic key.

At least one of: a power, a signal and a fluid conductor can enter, exit, or enter and exit the irrigation system chase enclosure. For safety and for practical reasons, the conductor's access to the irrigation chase enclosure is typically from below. The irrigation system disposed inside the chase can convey at least one of: power, signal, and fluid to the cultivation planter shelves and their associated devices. The irrigation system can also provide power and/or data to unrelated urban infrastructure devices coupled to the cultivation system structure.

Devices disposed inside and/or coupled to the irrigation system chase enclosure can include at least one of: a filter, an irradiation light source, a nutrient/additive mixing chamber, a fluid tank, a pump, a processor/controller with code and resident memory, a transceiver, a sensing device, a fluid manifold, an electronic faucet, a valve, a pipe, a coupler, a metering device, a back-up power source, a light source, a lighting arrestor, a fluid drain, a mechanical or electronic lock, a power management module that can include a transformer, a rectifier, an inverter, and irrigation fluid with or without nutrients and protective additives.

The irrigation system housed inside the irrigation chase enclosure can be configured to send irrigation fluid downstream to a plurality of planter shelves, and with some configurations, adapted to collect the fluid drained and re-circulate it through the irrigation system. The present innovation's irrigation fluid can be dispensed into the planter shelves from a remote location, from a holding tank inside the chase enclosure, or from a header panel above the planter shelves. All drained fluid can be collected by the base panel/s.

The irrigation methods include:
a. Coupled to (or conveyed through) the post's web, pressurized pipe with irrigation fluid dispenses fluid from above into a fluid reservoir of a planter shelf where root retaining plant matrixes are disposed on the top surface of the bottom wall flange of the planter shelf. Fluid to planter shelves coupled beyond flows through a jumper pipe that conveys the irrigation fluid through the post's webs.
b. Coupled to (or conveyed through) the post's web, pressurized pipe with irrigation fluid dispenses fluid inside the fluid reservoir below the root retaining plant matrixes disposed over the top surface of the bottom wall flange of the planter shelf. The pressurized pipe can couple to a plurality of planter shelves through post's webs conveying fluid downstream.
c. Coupled to (or conveyed through) the post's web, pressurized pipe dispenses fluid from above to root retaining plant matrix coupled to at least one of a: planter shelf's full height wall and bottom wall flange. The fluid then drains through weep holes in the fluid reservoir flange to the below.
d. A pipe conveys fluid through and between a post web/s to a header panel's and a controller signal opens an electronic valve to let fluid flow into a top planter shelf. Then by gravity the fluid reaches all planter shelves and drains into a base panel to be re-circulated or discarded.

The choice of which irrigation system is most suitable depends on at least one of: the terrain slope, the orientation of the plant material, the type of plant material, cost of water, the need to re-circulate the irrigation, and the specific market type demands.

The Root Retaining Matrix—Inside a fluid reservoir of a planter shelf, coupled to at least one of: the top surface of a bottom wall flange of the planter shelf and/or the interior surface of the full height side wall of the planter shelf, a seed and/or plant root retaining matrix is configured to provide best conditions to germinate seeds and facilitate plant growth.

The root retaining matrix can be made of (a) a scaffolding of organic plant material like coconut fibers and mineral like glass fiber, (b) moisture retaining mineral rock like vermiculite and/or perlite, (c) minerals like phosphorus, and (d) plant protecting additives that enhance plant growth and protect the plant from viruses, bacteria, and/or invasive pests.

The plant root retaining matrix form can be developed to fall within the clear dimensional width and height openings of the planter shelf. The plant root matrix can be horizontal with plants growing vertically or vertical where plants grow from the exterior surface of the planter shelf wall outwardly. One and the same cultivation wall can have a combination of vertical and horizontal plant root matrixes. Further, the plant root matrix dimensions can be configured to fall within packaging and shipping industry standards to reduce overall costs and waste.

The plant retaining matrix placed horizontally on top of the top surface of the bottom wall flange of the planter shelf is referred to herein as the plant brick. The plant retaining matrix that couples the full height side wall of the planter shelf is referred to herein as the plant tile. A plurality of plant bricks or plant tiles may be arranged side by side along the full length of the elongated planter shelf.

The plant brick—Resembling the form of a brick, the plant brick can be manufactured seeded with plant seeds and/or with plant material already growing from at least one surface. The brick can be produced with at least one recess configured to receive a plant seedling. The seedling typically grows in a basket and is commonly sold in home garden centers. The basket sizes are substantially standardized in the home garden centers. The brick's recess aperture, depth and interior walls' slope can be configured accordingly.

The brick generally receives fluid irrigation from below. However, in less automated irrigation solutions, the brick can be irrigated by a simple garden hose from above. Irrigating the brick can be configured by two methods or a combination thereof—capillary action and flooding. Capillary action is a preferred solution as it minimizes the consumption of irrigation fluid. Capillary aids such as fibrous wicks convey fluid from the fluid reservoir below the brick directly to the root base. Flooding can elevate the fluid level to a set point inside the fluid reservoir, and then the fluid can soak into the matrix medium. In at least one configuration, access fluid can be drained from the fluid reservoir.

In one embodiment the root retaining matrix brick placed inside the fluid reservoir on the top surface of the planter shelf's bottom wall flange is irrigated by irrigation fluid dispensed from a pressurized pipe. The pressurized pipe is disposed below the root retaining matrix inside a recess formed by a longitudinal mechanical key of the planter shelf. The pressurized pipe has at least one nozzle dispensing irrigation fluid inside the fluid reservoir. The pressurized pipe extends the approximate length of the planter shelf and couples to a through fluid coupler coupled to the post's webs disposed at the opposing sides of the planter shelf. In a different embodiment, at least on one end, the pressurized pipe can extend directly through a bore in the web of the posts.

For construction simplicity, the pressurized irrigation pipe extending the length of the planter shelf with couplers disposed at both ends can be factory installed, concealed inside a longitudinal mechanical key recess of the planter shelf thereby allowing for a "plug n' play" installation. Inside the recess and spaced apart, "C" clamps coupled to the base of the recess can secure the pressurized pipe in place. The planter shelf's bottom wall flange mounted irrigation pipe system can extend a long distance, having the pressurized irrigation pipe coupled to a plurality of wall sections having the same or different elevations.

Each continuous line of pipes with pressurized fluid can be controlled. The controller can control at least one of: fluid pressure, irrigation duration, pipe operation sequence, irrigation fluid mixture, and irrigation fluid temperature. In addition, at least one electronic faucet can be placed anywhere along a continuous piped line to drain fluid from the pipe.

The brick root retaining matrix can have a non-porous surface/s covering at least one of its lower external surface's with only moisture conveying capillary wicks extending outwardly from the brick's lower surfaces. With a surface covering impervious to moisture penetration, the wicks' fluid delivery to the plant's root base can be improved while saving irrigation fluid.

The plant tile—Resembling the form of a tile, the plant tile can be manufactured seeded with seeds and/or with plant material already growing from at least one surface. As with the plant brick, the plant tile can be produced using the same or a different mixture of scaffolding, moisture retaining material, minerals, nutrients, and additives to protect and enhance the plant's growth.

The plant tile can be produced with at least one recess configured to receive a plant seedling. The seedling typically grows in a basket and is commonly sold in home garden centers. The basket sizes are substantially standardized in the home garden centers. The recess aperture, depth and interior walls' slopes can be configured accordingly.

The plant tile can be produced with an external frame to help maintain the tile's verticality against the planter shelf's full height side wall. The plant tile can be configured to be secured to the side wall by mechanical means including screws or latching devices such as Velcro. The plant tile is configured to be removable and yet secured from unauthorized removal. For this reason, means to secure the plant tile to the planter shelf full height side wall can have a provision that an unauthorized attempt to remove the plant tile results in the tile's destruction. Destroying a plant tile offers no monetary benefit for the offender, discouraging vandalism and/or theft.

The tile can be used in urban wall systems where environmental and/or architectural concerns make implantation of horticulture material a priority. In northern latitudes the tile can grow moss or lichen; both have shown significant utility in scrubbing the air. In lower latitudes the tile can grow ivy type plants and/or shrubs. Near the equator or in other high moisture environments, the tile can grow succulent plants.

The vertical plant tile can be produced as a module having dimensions that correspond to at least the height of the full height side wall of the planter shelf. The modular panels can then also be configured in relation to the planter shelf's irrigation method. For low profile plant tiles, the irrigation methods can be the same as the methods described for the plant brick. For high profile plant tiles, the irrigation of the plant tile is from below the planter shelf top wall flange. Top side irrigation is the preferred method for tile exceeding one foot in height.

The top side irrigation assembly of the plant tile coupled to a planter shelf comprises a pressurized irrigation pipe with at least one nozzle dispensing irrigation fluid onto root retaining tile matrix material below. At least one through weep hole formed at the top and bottom wall flanges of the planter shelf can allow access fluid to drain through the planter shelf to the below.

The planter shelf irrigation system irrigating the plant tile by a pressurized pipe can extend a long distance. The pressurized pipe is coupled to the bottom side of the planter shelf top wall flange, secured by "C" latches. The pressurized pipe extends the approximate length of the planter shelf and couples to a through fluid coupler coupled to the post's webs disposed at the opposing sides of the planter shelf. In a different embodiment, on at least one end, the pressurized pipe can extend directly through a bore in the web of the posts.

For construction simplicity, the pressurized irrigation pipe extending the length of the planter shelf with couplers disposed at both ends can be factory installed, concealed inside a longitudinal mechanical key recess of the planter shelf allowing for a "plug n' play" installation.

Each continuous line of pipes with pressurized fluid can be controlled. The controller can control at least one of: fluid pressure, irrigation duration, pipe operation sequence, irrigation fluid mixture, and irrigation fluid temperature. In addition, at least one electronic faucet can be placed anywhere along a continuous piped line to drain fluid from the pipe.

The control unit can also be coupled to sensing devices. The sensing devices can be coupled to a planter shelf, a post, and a base panel. Fluid arriving at the bottom shelf can drain into a collector and be recirculated by the irrigation system. The irrigation fluid draining to the below can flow into a base panel configured to collect and convey the fluid from one base panel to the next back to the irrigation system. The fluid is then filtrated and can be irradiated by a light source before being recirculated into the cultivation wall irrigation system.

An alternate planter shelf irrigation system that can irrigate both the plant tile and the plant brick comprises a header panel with an electrical faucet and at least two posts, two planter shelves, a plant tile and/or a plant brick and irrigation fluid.

The Cultivation Wall Power and Communication—The modular vertical plant cultivation wall may employ sensing, processing, communicating, power generating, and actuating devices. These devices can be coupled to the irrigation system or can operate in unison with the irrigation system while providing utility for other non-irrigation related system/s, or can operate independently from the plant irrigation system of the modular cultivation wall system. A least one device can be coupled to at least one of: an irrigation chase enclosure, a post, a planter shelf, a head panel, a wall panel, and a base panel.

The devices coupled to the modular vertical plant cultivation wall elements can include at least one of: a pump, an irradiating light source, a filter, a processor/controller with code and resident memory, an electronic faucet, a valve, a transceiver, a power storage unit, a power generating unit, a light source, a camera, a photo cell, a speaker/microphone, an air quality sensor, a temperature sensor, a wind velocity sensor, an air pressure sensor, a vibration sensor, and a humidity/moisture sensor.

The irrigation system can be placed inside the chase enclosure or can be remotely located. For example, in one embodiment, a cultivation wall is coupled to a building elevation. The irrigation system can be placed inside the building, wherein the power and/or the irrigation fluid flow to and from the wall cultivation system from the building's interior. In another example, the irrigation system is integral to the wall, housed inside the chase enclosure. In this example as well as with a free-standing wall, bi-directional communication can be wired or wireless.

The irrigation system of the modular vertical cultivation wall disposed inside the chase enclosure flows irrigation fluid to the planter shelves. The irrigation system chase is defined by two aligned posts in one direction and two closure panels in the other direction across from one another. At least one of the closure panels can be an access door to the chase's interior. The space formed between the chase defining walls is sufficiently large to accommodate the cultivation wall irrigation system.

The irrigation system chase enclosure is an important element of the present innovation in the sense that it provides a secured location to house the irrigation equipment and other private and municipal infrastructure related devices in urban spaces where stand-alone enclosures are costly and undesired. While serving as an integral wall element the chase enclosure is tamper proof for vandals and thieves. Located in public spaces, the enclosure is configured to protect the public from contact with electrical devices and to allow for easy accessibility for service providers.

The planter shelves are stacked on one another, retained by the flanges of the chase post web. The immediate proximity of the planter shelves to the chase enclosure enables the flow of irrigation fluid and power or data connectivity directly to the planter shelves, wherein the costly components of the irrigation system are secured inside the chase's enclosure. The planter shelf irrigation pipes and electrical conductors can be concealed from direct view, lessening the likelihood of tampering. All external power outside the irrigation system chase enclosure is configured to be low voltage. The devices coupled to the planter shelf include at least one of: a light source, a moisture probe, an electronic faucet, a mechanical or electrical valve, and/or at least one output and/or sensing device.

The light source can have an elongated continuous structure that is rated for outdoor operation. The light source structure can be concealed inside a recess formed by the longitudinal mechanical key of the planter shelf. The light source can be controlled to modulate the light emitted spectrum. Further, communicative coupled to the occupancy sensing device/s, the light source can turn on upon sensing movement in the vicinity of the wall. The sensing device may also activate a silent or an audible alarm and may also transmit data and/or images to a local and/or remote address.

The moisture probe can be disposed inside the fluid reservoir coupled to at least one plant retaining matrix. The moisture probe can communicate wired or wireless. Signal from the probe is relayed to at least the irrigation controller. The signal can include input about the moisture conditions. The moisture probe is typically placed at the farthest point from the fluid point of entry into the fluid reservoir of the planter shelf. The moisture probe can be embedded in the plant brick or the plant tile. Power and/or data conductors coupled to the moisture probe/s and/or electronic faucet/s can be placed inside the fluid irrigation reservoir, at the underside of the planter shelf bottom wall flange, or at the bottom side of the planter shelf's top wall flange.

An electronic faucet can be coupled to the post web and/or to the pressurized pipe coupler inside the planter shelf. The electronic faucet can receive its power through a low voltage power and/or data conductor disposed in the vicinity. Similarly to the pressured irrigation pipe, the power or data line can extend the length of the planter shelf and can be coupled to at least one sensing and/or output device. The power and data conductor can also be coupled to a plurality of planter shelves extending over a great distance.

Devices typically coupled to the cultivation wall exterior surfaces can include at least one of: a photovoltaic panel and/or any other power generating device, an antenna, a lightning arrestor, a temperature, barometric and/or air quality sensor, a camera supported by image analysis code, an audio device, a lighting device, a device counting human and vehicular traffic, and where needed, a messaging board. At least one of the devices can be used for other than the direct needs of the cultivation wall system and can operate independently or in conjunction with the cultivation wall system for at least one of: the public and the private sector/s benefits.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIGS. 2A, 2B, 2C, 2D, 2E and 2F show partial perspectives of the post with FIGS. 2D, 2E and 2F showing the post together with partial wall panels.

FIGS. 3A, 3B, 3C, 3D, 3E, 3F, 3G, 3H, 3I, and 3J show transverse cross sections of the planter shelf and panel types of the vertical cultivation wall.

FIGS. 7A and 7B, show enlarged sections of a planter shelf where fluid enters the fluid irrigation reservoir from a spout above an endcap and exits to the below. FIGS. 7C and 7D show enlarged sections of a planter shelf where fluid enters and exits the fluid irrigation reservoir above the endcap wall.

FIGS. 8A and 8B show a longitudinal and a transverse section and FIG. 8C shows a partial perspective of a planter shelf with the plant brick root retaining matrix where fluid is dispensed from above a plant brick.

FIGS. 9A and 9B show a longitudinal and a transverse section and FIG. 9C shows a partial perspective of a planter shelf with the plant brick root retaining matrix where fluid is dispensed from below a plant brick.

FIGS. 12A and 12B show enlarged sections of a planter shelf where fluid enters and exits the fluid reservoir above plant tile and/or plant brick. FIGS. 12C and 12D show enlarged sections of a planter shelf where fluid enters a header panel enclosure and exits to the planter shelf below.

FIGS. 13A and 13B show a longitudinal and a transverse section and FIG. 13C shows a partial perspective of a planter shelf with the plant tile root retaining matrix coupled to the planter shelf full height wall.

FIGS. 15A and 15B show a longitudinal and a transverse section and FIG. 15C shows a partial perspective of a planter shelf with the plant tile root retaining matrix is disposed in the fluid reservoir and irrigation fluid stored in a header panel.

DETAILED DESCRIPTION OF EMBODIMENTS OF THE INVENTION

Figure 1:
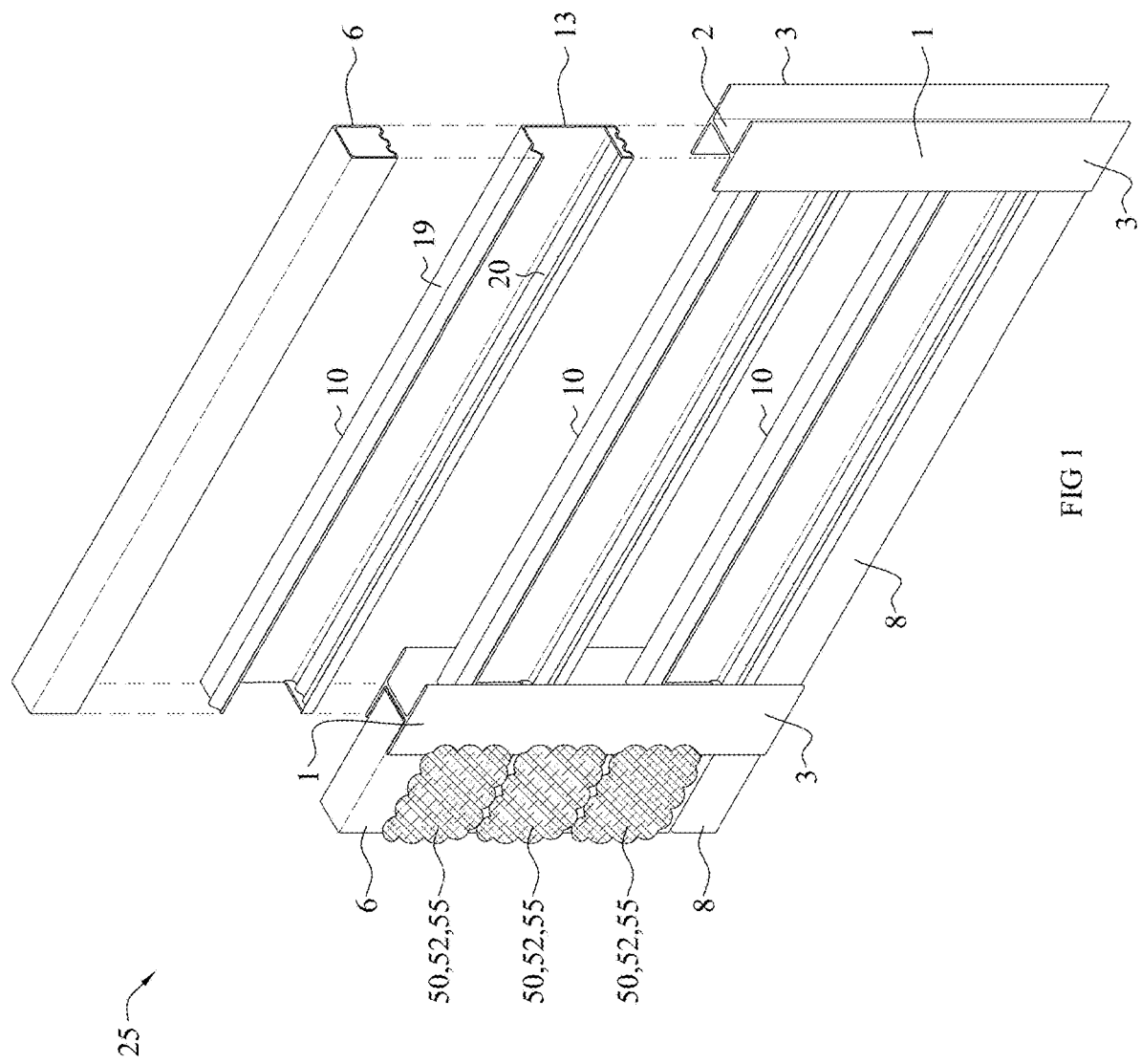
FIG. 1 shows an exploded perspective view of a cultivation wall with a section showing plant material.

To provide a general overview of the invention, FIG. 1 shows an exploded perspective view of the modular cultivation wall 25. The wall's key elements comprise at least two elongated vertical posts 1 and at least two elongated planter shelves 10, an optional base panel 8 and an optional header panel 6. The at least two posts 1 are configured to be vertically anchored to retaining surface, such as the ground and/or a vertical surface. The modular cultivation wall further comprises an irrigation system 30 which is not included in FIG. 1. The irrigation system may be any of the irrigation systems, or combinations thereof, to be described below.

Each post 1 comprises, as will be better described below, a web 2 and at least two flanges 3. The flanges 3 are arranged side by side with one or more longitudinally extending gaps being formed between the flanges 3.

The elongated planter shelf 10 has a substantially C-shaped cross section formed by at least one of a top wall flange 19, a bottom wall flange 20, a full height side wall 13 connecting the top wall flange 19 and the bottom wall flange 20, and a short side wall 12. The short side wall 12 preferably extends from the bottom wall flange 20.

The at least two elongated planter shelves 10 are configured to be horizontally disposed, one on top of the other between the two posts 1 with their free ends disposed in the gaps between the flanges 3 on the two posts 1. The stacked subset of planter shelves 10 may be coupled to the optional lower elongated base panel 8. The base panel 8 is configured to be horizontally disposed between the two vertical posts 1 with its ends disposed in the gaps between the flanges 3.

The modular cultivation wall 25 may comprise an upper elongated header panel 6. The header panel 6 is configured to be horizontally disposed between the two vertical posts 1 with its ends disposed in the gaps between the flanges 3 of the two vertical posts 1. A bottom wall of the header panel 6 may be configured to couple to the upper most planter shelf 10 in the subset of planter shelves.

The substantially C-shaped cross section of the individual planter shelf 10 defines an elongated, mainly sidewardly open compartment configured to retain seed and/or plant root retaining matrixes 50 that grow plant material 55 when exposed to fluid.

The present figure also shows across a vertical post 1 an example of plant material 55 coupled to the cultivation wall 25. The coupled plant material 55 is associated with three planter shelves 10 retaining a plant tile 52 root retaining matrix 50.

The thus formed cultivation wall 25 is modular in the sense that the cultivation wall can be adapted in the height direction by increasing/reducing the number of planter shelves 10 in the subset of planter shelves to be disposed between two posts 1. Further, the overall length of cultivation wall 25 may be adapted by adding additional vertical posts 1 and hence additional subsets of planter shelves 10.

FIGS. 2A-2C show perspective views of three different embodiments of the elongated post 1 that may be used in the modular cultivation wall 25. The three embodiments basically differ in the number of flanges.

Starting with FIG. 2A, the post 1 comprises one web 2 and two flanges 3 projecting from each side of the web 2. The web 2 and the flanges 3 are unitarily formed, e.g. by welding, by extrusion or by pultrusion. The flanges 3 are positioned substantially perpendicular to the web 2 and can be disposed on at least one side of the web 2. The post 1 is configured to be anchored to a retaining surface. The retaining surface can be the ground 98 and/or a vertical retaining structure 97, see FIG. 6. In a preferred embodiment, the post 1 is made of non-metallic, non-cement, fibrous material. In other embodiments, the post 1 can be made of metal, cement, and/or other materials.

Figure 6:
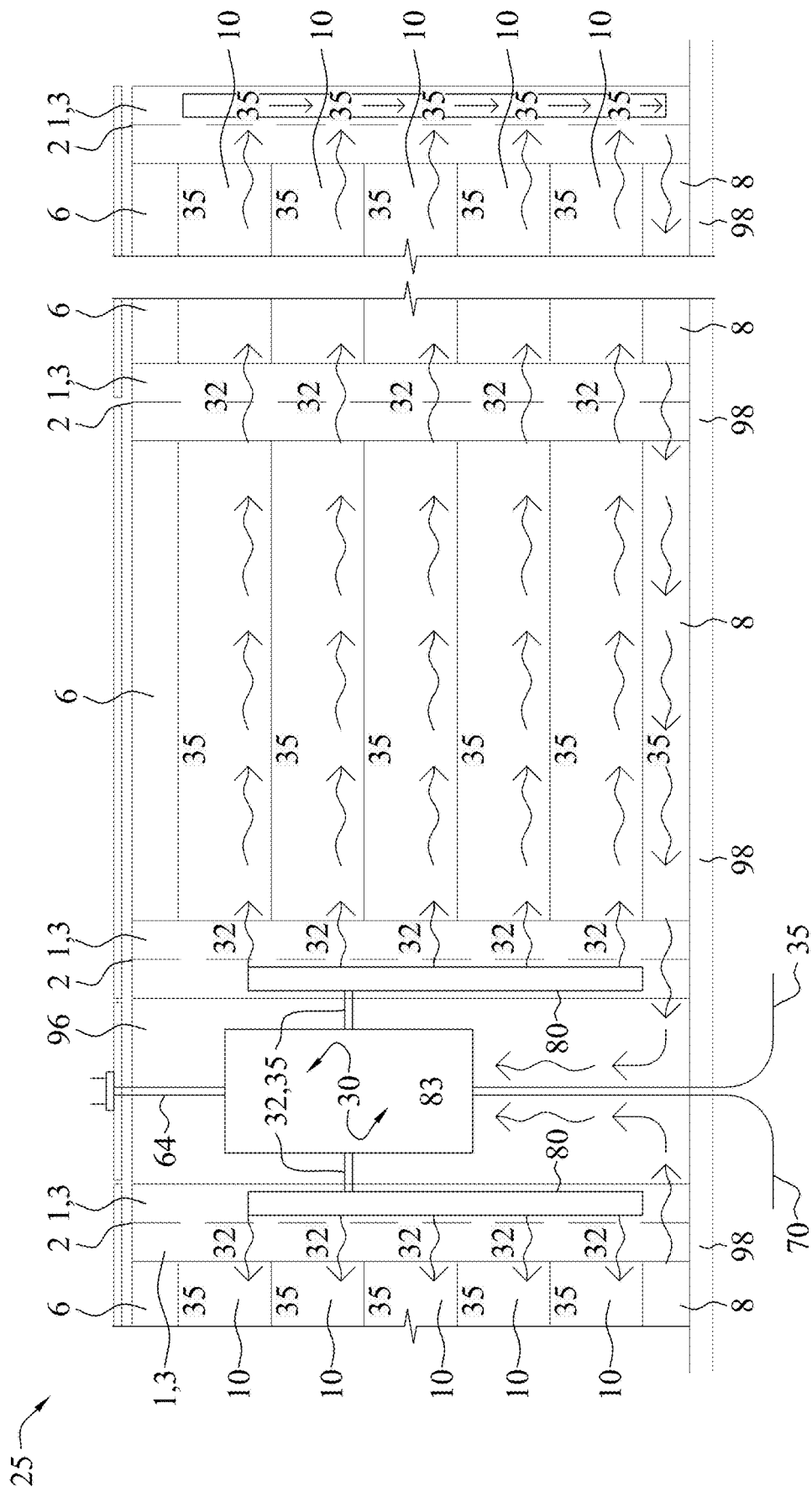
FIG. 6 shows an exemplary irrigation fluid flow diagram of the plant brick cultivation wall with an integral irrigation system housed in a chase enclosure.

The post 1 may form part of a chase enclosure 96, best seen in FIG. 6. The web 2 of the post 1 can have at least one through opening 24. The at least one opening 24 enables at least one of: fluid 35 passage, electrical/data conductor 70 passage, and passage for mechanical connectivity device/s 99, see e.g. FIGS. 7A-7D. In a different embodiment, at least one of the post's flanges 3 can also have at least one through opening to allow passage of fluid or conductors. In addition, at least one electronic device 86 can be coupled to the post 1.

The post 1 disclosed in FIG. 2A shows a post with one web 2 and two flanges 3 positioned perpendicularly to the web 2 at both ends and extending outwardly. This post 1 is configured to be used for a cultivation wall that retains between its flanges 3 a single layer of planter shelf 10 and/or a single panel wall 7.

Now turning to FIG. 2B, another embodiment of the post 1 is disclosed. FIG. 2B shows a post 1 with one web 2 which on each side thereof comprises three flanges 3. This kind of post 1 is suitable for a double-sided cultivation wall 25. The three flanges 3 on each side of the web 2 are positioned perpendicularly and extend outwardly from the web 2. The three flanges 3 are disposed equidistant to each other. This post flange 3 is configured to retain a double wall. For example, one wall can comprise planter shelves 10 while the other sound attenuation 91 wall panels 7.

FIG. 2C shows another embodiment of a post 1. The post differs from the post 1 of FIG. 2B in the distance between the flanges 3. The distance between the flanges 3 directly corresponds to the width of the shelves/panels 10, 6, 7, 8 to be disposed between the flanges 3. The clearances between the flanges 3 and the flanges/panel 10, 6, 7, 8 is minimal. In this figure one wall width is wider than the other.

Now turning to FIG. 2D, the post 1 of FIG. 2A is disclosed as being provided with a first and a second planter shelf 10 that are coupled to each other, one on top of the other by a mechanical key 11.

The disclosed subset of planter shelves 10 of FIG. 2D are configured to retain a double-sided planter wall by supporting seed and/or plant root retaining matrixes 50 on both sides of the wall.

Now turning to FIG. 2E, the post 1 of FIG. 2B is disclosed as being arranged to retain on a first side thereof a single sided plant tile planter 52 wall and on a second side thereof a sound attenuation 91 wall panel 7.

FIG. 2F, using the post 1 of FIG. 2C shows a single sided plant brick planter 51 wall next to a single sided plant tile 52 planter wall. The skilled person realizes both sides of the wall may be provided with single sided plant brick 51 planters or single sided plant tile 52 planters.

In this and all other configurations, the post 1 can be painted to match a specified color and/or, receive printed text and/or pattern or can be coupled to a veneer layer such as cultured stone or a lathing board.

FIGS. 3A, 3B, 3C, 3D, 3E, 3F, 3G, 3H, 3I, and 3J show transverse cross sections of the planter shelf 10 and panel types of the vertical cultivation wall 25. The disclosed embodiments are directly applicable to the modular cultivation wall 25 described in FIG. 1 and to the posts 1 described in FIGS. 2A-2F.

As given above, the planter shelf 10 is a modular elongated structure that is self-supported and configured to grow plant material. The planter shelf 10 may be made of fibrous material that enables a thin wall profile while being extremely strong to support vertical loads from above. The material may by way of example be glass fiber and polyester.

The planter shelf 10 comprises at least one of: a top wall flange 19, a bottom wall flange 20, a full height side wall 13 connecting the top wall flange 19 and the bottom wall flange 20, and a short side wall 12. The top wall flange 19, the bottom wall flange 20, the full height side wall 13 connecting the top wall flange 19 and the bottom wall flange 20, and the short side wall 12 may together in one embodiment provide the planter shelf 10 with a substantially C-shaped cross section. The planter shelf 10, is, as described above in connection to FIG. 1 configured to be horizontally disposed between the at least two flanges 3 of each of the two vertical posts 1. The planter shelf's 10 longitudinal ends are configured to be disposed in a sliding manner between at least two flanges 3 of at least two anchored posts 1. While the two posts 1 are anchored to a retaining surface, such as the ground 98 or a vertical wall 97 such as a building, the planter shelves 10 are configured to be freely removable from the gap between the respective flanges 3 of the post 1. As a result, the weight of all elements that are to be slidingly arranged in a vertically stacked manner between the flanges of two adjacent posts, no matter if it is a plurality of planter shelfs or wall panels, a header panel or a base panel, will be directed to a below retaining surface substantially without applying vertical loads on the at least two vertical posts.

When planter shelves 10 are placed on one another in a stacked manner, the ends of the first removable planter shelf 10 are disposed between the at least two flanges 3 of each of the two posts 1. A second removable planter shelf 10 is longitudinally coupled from above to the first planter shelf 10 with its longitudinal ends disposed between the post flanges 3 retaining the first planter shelf 10. The first and the second planter shelves 10 are coupled by a longitudinal mechanical key 11. The planter shelf 10 wall can be used as a stand-alone wall or in combination with other wall panel types 6, 7, 8. The following figures introduce the various planter shelves 10 and wall panel types 6, 7, 8.

FIG. 3A shows a transverse cross section of a narrow wall panel 7. This and all other wall panels 6, 8 comprise two set apart, opposing vertical walls with a gap between referred to herein as the side walls 26, and two horizontal top and wall flanges 19, 20 disposed and unitarily coupled at the opposite sides of the vertical side walls 26. These horizontal walls referred to herein are the top wall flange 19 and the bottom wall flange 20. The side walls 26, the top wall flange 19 and the bottom wall flange 20 of the panels do together form an enclosure. The wall panel 7 can have at least one of: a recess and/or a protrusion on at least one of its top wall flange 20 and bottom wall flange 19. The at least one recess and/or protrusion 27 of a first planter shelf 10 is configured to couple to a reciprocating recess and/or a protrusion 27 of another planter shelf/wall panel 10, 6, 7, 8 coupled from below and/or above. The recess and/or protrusion 27 can also be compatible with any other panel type. Thereby a mechanical key 11 is provided for as the wall panel 7 connection is combined with another wall panel 6, 7, 8 or a planter shelf 10.

FIG. 3B shows a transverse cross section of a wider wall panel displaying the same properties as the narrow wall of FIG. 3A.

FIG. 3C shows a transverse cross section of a narrow wall panel 7 of the same type previously discussed with reference to FIG. 3A. The disclosed wall panel 7 comprises an infill of sound attenuation material 91.

FIG. 3D shows a transverse cross section of a narrow sound attenuation 91 wall panel 7 of the same type as that of FIG. 3A, wherein the panel 7 is fully enclosed and the air pressure inside the panel 7 enclosure is less than the pressure outside (vacuum state 90).

FIG. 3E shows a transverse cross section of an enclosed header panel 6. The header panel 6 comprises at least one elongated recess and/or protrusion 27 on its bottom wall flange 20 to allow the header panel 6 to couple to a top wall flange 19 of at least one planter shelf 10 or a wall panel 7. In this figure, the interior space of the header panel 6 is disclosed as being filled with irrigation fluid 35 in accordance with at least one of the planter shelf wall 10 irrigation configurations to be described below. In other applications, the header panel's 6 interior space can be accessible to store at least one of mechanical and/or electrical devices 86. It can be configured to convey power/data 70. It can be configured to store fluid 35. Additionally, or alternatively, it can retain from above power generating devices 81 such as photovoltaic panels 82.

FIG. 3F shows a transverse cross section of an enclosed base panel 8. The base panel 8 is generally configured to provide protection for the planter shelves' 10 wall by elevating the planter shelves 10 above the terrain. Thus, the base panel 8 may be configured to be arranged as the lower most element in a subset of planter shelves 10 or wall panels 7 in a vertical cultivation wall system 25. The base panel 8 can have at least one elongated recess and/or protrusion 27 of the type described above on its top wall flange 19 to couple to a bottom wall flange 20 of at least one planter shelf 10 or a wall panel 7. In this figure, the interior space of the base panel 8 is filled with irrigation fluid 35 in accordance with at least one of the planter shelf wall 10 irrigation configurations to be described below. The base panel 8 is configured to collect the fluid 35 drained from the planter shelf wall 10 and convey the fluid 35 back to the irrigation system 30 to be re-circulated.

FIG. 3G shows a transverse cross section of one embodiment of a narrow planter shelf 10. The planter shelf 10 has a single sided profile opening similar to the letter "C" having a full height vertical side wall 13 on one side and at least one short side wall 12 on the opposite side. The profile further comprises a top wall flange 19 and a bottom wall flange 20. The full height side wall 13 connects the top wall flange 19 and the bottom wall flange 20.

The thickness of the vertical full height side wall 13 may vary from bottom to top corresponding to the total weight expected to be imposed from above during use of the planter shelf 10 in a cultivation wall system 25. The full height side wall 13 is unitarily coupled to the top wall 19 flange and the bottom flange 20 below.

The top wall flange 19 and/or the bottom wall flange 20 are provided with at least one recess and/or protrusion 27 of the same type as being discussed above in FIGS. 3A-3F. A first planter shelf 10 is thereby configured to couple to a reciprocating recess and/or a protrusion 27 of a second planter shelf/wall panel 10, 7 that is configured to be coupled from below and/or above in order of providing a sub-set of planter shelves 10 and/or wall panels 7 in a cultivation wall system 35. The recess and/or protrusion 27 can also be compatible with any other panel type 6, 8. Thereby a mechanical key 11 is provided for as the wall panel 7 connection is combined with another wall panel 7 or a planter shelf 10.

The walls of the C-shaped cross section define a cavity configured to receive at least one plant root retaining matrix 50. The plant root retaining matrix 50 is in FIG. 3G disclosed as resting on an upper surface of the bottom wall flange 20. As will be discussed below with reference to FIG. 3J, the plant root retaining matrix 50 may alternatively be removably connected to the vertical full height side wall 13 of the planter shelf 10.

The planter shelf 10 can have at least one of: a recess and/or a protrusion 27 on at least one of its top wall flange 19 or bottom wall flange 20 configured to couple to a reciprocating recess and/or a protrusion 27 of a planter shelf/wall panel 10, 7 coupled from below and/or above.

Inside a recess formed by the at least one recess and/or protrusion 27, at least one of a pressurized fluid pipe 43 and a power/data conductor 70 can extend the length of the planter shelf 10. The ends of the planter shelf 10 can at least partially be capped by endcap walls 15 to form a fluid reservoir 31 (not shown). The endcap walls 15 couple to at least one of: the exterior end of the elongated planter shelf 10 and at least three interior surfaces of the planter shelf 10. The bottom wall flange 20 can have at least one opening 24 to enable at least one of: convey/drain fluid 35 and/or power/data 70 between one planter shelf 10 and another, draining the fluid reservoir 31 and coupling a mechanical and/or electrical device 86.

FIG. 3H shows a wider version transverse cross section of the planter shelf 10. The wider planter shelf 10 profile is most suitable for use with a plant brick 51 root retaining matrix 50, whereas the narrow profile planter shelf 10 is suited to be used with the plant tile 52 root retaining matrix 50 (not shown).

FIG. 3I shows a transverse cross section of another embodiment of a planter shelf 10 having back-to-back planters 10 with a common full height web wall 13. In this embodiment, one side of the cross section (right hand side) is provided with a short vertical side wall 12, whereas the other side of the cross section (left hand side has a substantially fully open portion. The left-hand side of the planter shelf 10 is disclosed as supporting a plant tile 52 root retaining matrix 50 that is removably attached to one side of the full height side wall 13, whereas the opposing right-hand side of the planter shelf 10 is disclosed as supporting a plant brick 51 root retaining matrix 50 that is supported by the bottom wall flange 19. The width of each of the coupled planters 10 can be the same or different. The type of the root retaining matrix 50 placed inside each of the two planters 10 can be the same or different. Corresponding to the root retaining matrix 50 type, the irrigation and fluid 35 evacuation systems of each of the two planter shelves 10 can be the same or different. As with the other planter shelve 10 types described above, the present embodiment can employ a longitudinal mechanical key 11 of the type described above on at least one top and or bottom flange 19, 20 and shares the same features for the irrigation fluid 35 and data/power 70 conveyance.

FIG. 3J shows a transverse cross section of a planter shelf 10 and a wall panel 7 disposed back-to-back with each planter shelf/panel wall 10, 7 ends disposed inside separate openings in a post web 1 beyond (not shown). Thus, the post 1 may be of the type disclosed in FIG. 2E.

One of the panels 10, 7 in the cultivation wall system 25 is disclosed as being a planter shelf 10 while the other is disclosed as being a wall panel 7. The features of each type of these panels 10, 7 is described above. Thus, to avoid undue repetition, reference is made to the sections above. In addition, the space between the panels 10, 7 can provide additional utility including projectile resistance sheeting, a sensing barrier, and a radiation/electromagnetic barrier. In this and all other configurations, all planter shelves 10 and panels 6, 7, 8 can be painted to match a specified colour and/or, receive printed text and/or pattern or can be coupled to a veneer layer such as cultured stone or a lathing board.

The planter shelf 10 profile is scalable and adaptable to at least four methods of irrigation that will be described below. The methods are interchangeable depending on the intended installation. Some of the methods require a planter shelf fluid reservoir 31 (not shown) while others may require a local header panel 6 enclosure or a remote fluid reservoir (not shown). Further, in some methods, the fluid 35 may be configured to flow laterally from one subset of planter shelves 10 arranged between a first and a second post 1, to another subset of planter shelves 10 arranged between the second post 1 and a third post 1. The flow from one subset of planter shelves 10 to the other may be arranged via an opening 24 in the web 2 of the common post 1, in this case the second post 1. In another method the fluid 35 may flow by gravity down to planter shelves 10 below through weep holes 24, 39 or through an overflow stem pipe 37 (not shown). The irrigation fluid 35 dispensed through the lateral and the vertical circulation methods can be collected, e.g. in the base panel 8 and can be re-circulated.

FIGS. 4A, 4B, 4C, 4D, 4E and 4F show two types of seed and plant root retaining matrixes 50.

As exemplified above, a seed and/or plant root retaining matrix 50 may be configured to be arranged inside the planter shelf 10, coupled to at least one of: the top surface of a bottom wall flange 20 of the planter shelf 10 and/or the interior surface of the full height side wall 13 of the planter shelf 10. Thereby very good conditions are provided to germinate seeds and facilitate plant material 55 growth.

The root retaining matrix 50 can be made of a scaffolding of organic plant material 55 like coconut fibers and mineral like glass fiber mixed with volcanic rock like vermiculite and/or perlite that provide moisture retention and nutrient 41 minerals like phosphates and plant protecting additives 42 that enhance the plant growth and protect the plant from viruses, bacteria and/or invasive pests.

The plant root retaining matrix 50 form can be developed to fall within the clear dimensional width and height openings of the planter shelf 10. The plant root matrix 50 can be horizontal with plants material 55 growing vertically, or vertical where plants material 55 grow from the exterior surface of the planter shelf 10 outwardly. Further, the plant root matrix 50 dimensions can be configured to fall within packaging and shipping industry standards to reduce overall costs and waste.

A seed and/or plant root retaining matrix placed horizontally on top of the top surface of the bottom wall flange 20 of the planter shelf 10 is referred to herein as the plant brick 51. A seed and/or plant retaining root matrix 50 that couples the full height side wall 13 of the planter shelf 10 is referred to herein as the plant tile 52.

Figure 4F:
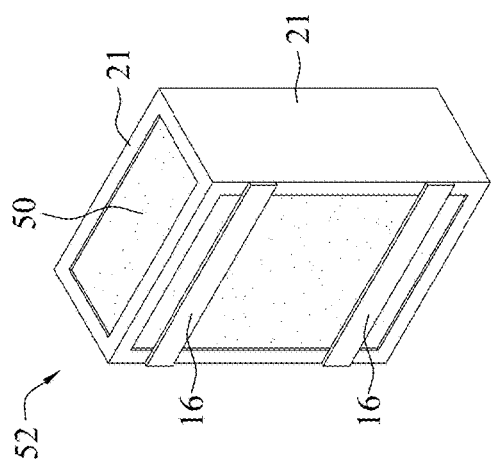
FIGS. 4A, 4B, 4C, 4D, 4E and 4F show two types of seed and plant root retaining matrixes.
Figure 4E:
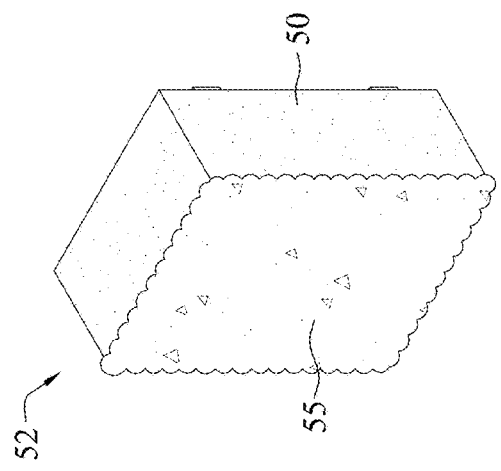
Figure 4D:
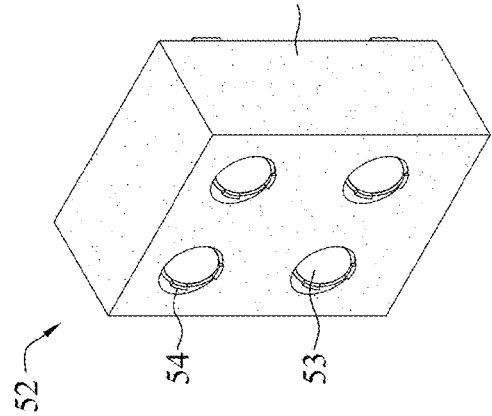
Figure 4C:
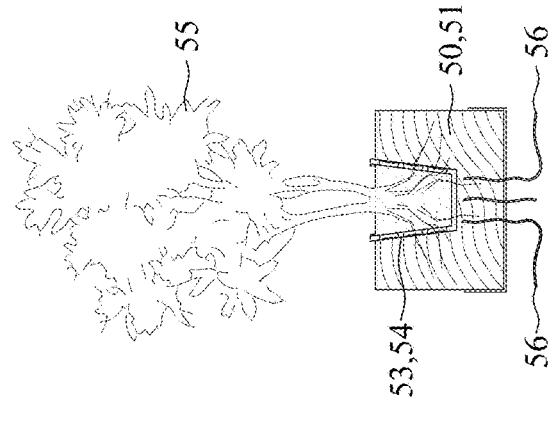
Figure 4B:
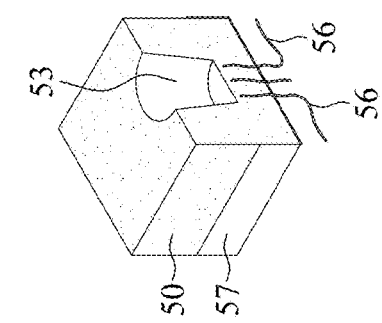
Figure 4A:
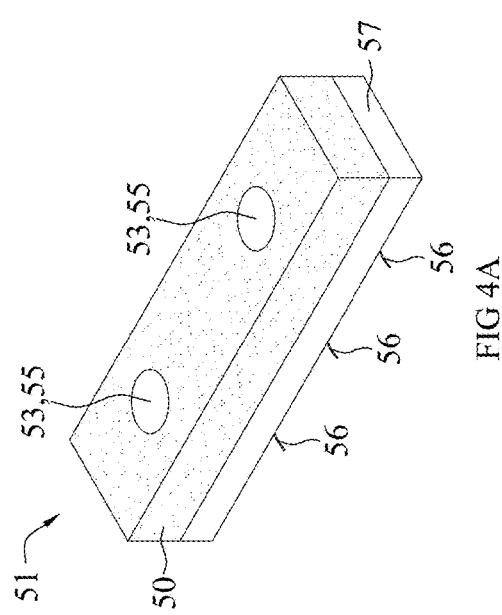

FIG. 4A shows a perspective of one embodiment of a seed and/or plant root retaining matrix 50 constituting a plant brick 51. FIGS. 4B and 4C show cross section views of the plant brick 51.

FIG. 4A shows a top perspective of the seed and/or plant root retaining matrix 50 plant brick 51. The present embodiment shows a non-porous cover 57 membrane that can be coupled to at least the bottom and a portion of the side wall of the plant brick 51. This configuration is suited for plant material 55 irrigation by capillary action. Fluid 35 conveyed through wicks 56 disposed at least on the bottom of the plant brick 51, passes through the non-porous cover 57 membrane and conveys to a seed and/or plant root matrix' 50 root base. Recessed apertures 53 at the top surface of the plant brick 51 are configured to receive seed/plant baskets 54. The dimension of the plant brick 51 corresponds to at least the cross-sectional dimensions of the planter shelf 10. In use in a cultivation wall system 25, a plurality of root retaining matrix plant bricks 51 may be arranged side by side along the length of the elongated planter shelf 10.

FIG. 4B is a partial perspective view of the plant brick 51 and a transverse cross section through a brick recess aperture 53 configured to receive a seed/plant basket 54. In this view the fluid 35 conveying wicks 56 are shown originating in proximity to the bottom of the plant brick 51 aperture recess 53 extending through the non-porous cover 57 membrane to the below.

FIG. 4C shows a transverse cross section of the root retaining matrix 50 of the plant brick 51 with the same elements and a plant basket 54 disposed inside the seed/plant recess aperture 53.

FIGS. 4D and 4E show a perspective view of a plant tile 52. Resembling the form of a tile, the plant tile 52 can be manufactured seeded with seeds and/or with plant material already growing from at least one surface of the plant tile 52. As with the plant brick 51, the plant tile 52 can be produced using the same or different mixture of scaffolding, moisture retaining material, nutrient minerals 41, and additives 42 to protect and enhanced the plant's growth.

FIG. 4D shows a plant tile 52 with four recesses apertures 53, each configured to receive a seed or plant seedling 54, 55. The skilled person realizes that the number or recesses and their pattern may be changed within the scope of the invention. The seedling typically grows in a basket 54 and is commonly sold in home garden centers. The basket 54 sizes are substantially standardized in the home garden centers. The recess aperture 53, depth and interior walls' slopes can be configured accordingly.

In FIG. 4E plant material 55 is shown growing from the plant tile's 52 exterior facing surface, i.e. the surface configured to face away from the cultivation wall system 25. In northern latitudes the tile 52 can grow moss or lichen; both have shown significant utility in scrubbing the air from pollutants. In lower latitudes the plant tile 52 can grow ivy type plants and/or shrubs. Near the equator the tile can grow succulent plants.

FIG. 4F shows in perspective view one exemplary embodiment of the back side of the plant tile 52. The plant tile 52 can be produced with an external frame 21 to help maintain the tile's 52 verticality against the planter shelf's full height side wall 13 (not shown). The plant tile 52 can be configured to be removably secured to the full height side wall 13 by mechanical means including screws, nail like anchor hooks secured to the full height side wall 13 of the planter shelf 10 or latching devices 16 such as Velcro strips coupled to both the plant tile 52 back and to the planter shelf's 10 full height side wall 13 (not shown). The plant tile 52 is configured to be removable and yet be secured from unauthorized removal. For this reason, means to secure the plant tile 52 to the planter shelf's 52 full height side wall 13 can have a provision that an unauthorized attempt to remove the plant tile 52 results in the tile's destruction. Destroying a plant tile 52 offers no monetary benefit to the offender, discouraging vandalism and/or theft. The means to secure the plant tile 52 to the planter shelf can be at the exterior face of the plant tile 52, at the interior of the plant tile 52, or at both ends combined.

Figure 5:
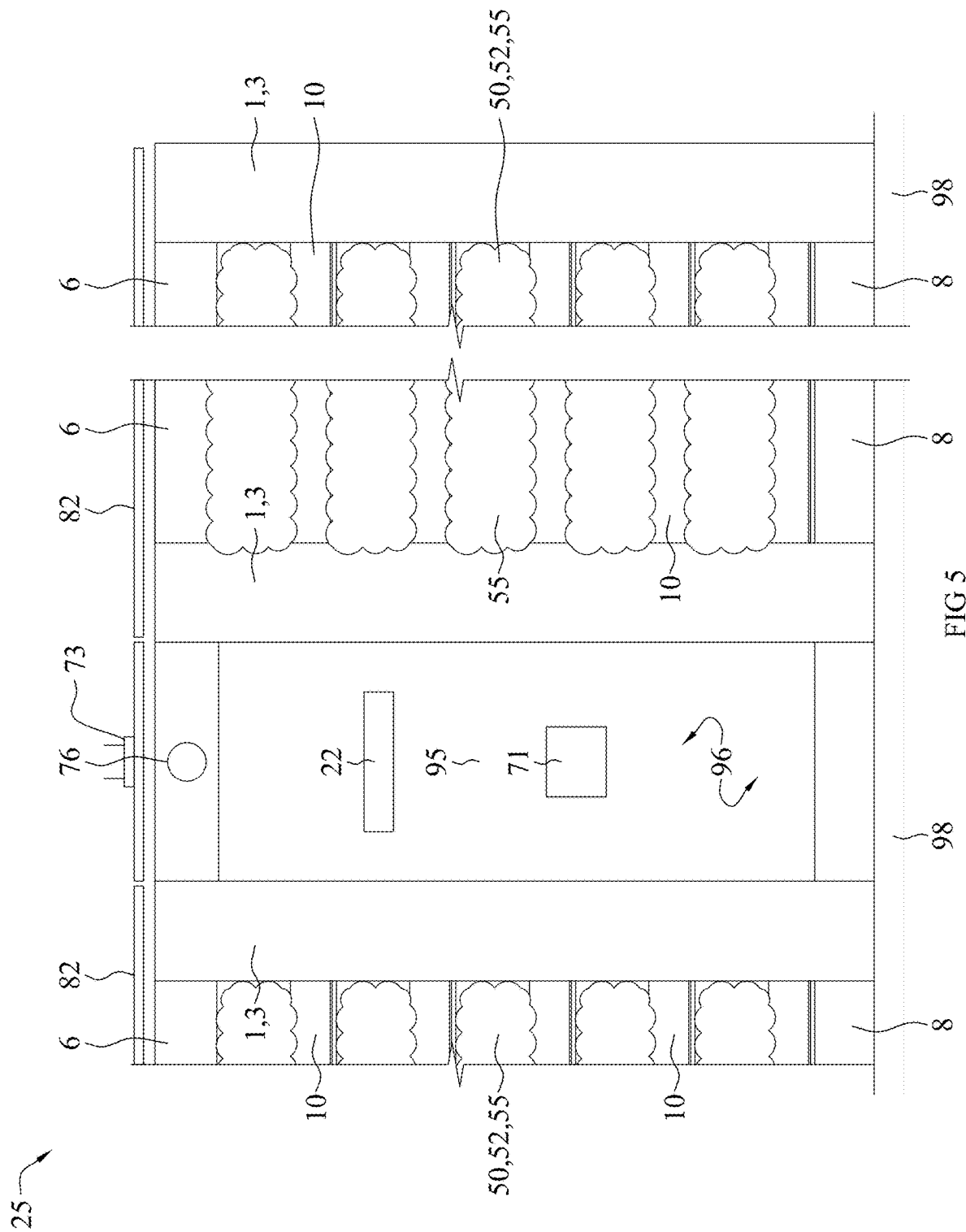
FIG. 5 shows a partial elevation of the modular vertical cultivation wall of the plant brick with an integral irrigation system chase enclosure.

FIG. 5 shows one embodiment of a partial elevation of a modular vertical cultivation wall 25 including an irrigation system chase enclosure 96.

The chase enclosure 96 of the irrigation system is shown as being disposed between two posts 1. Subsets of planter walls of the type discussed above are positioned between the posts' flanges 3. In the present figure the subsets do each comprise, starting from above, a header panel 6, a plurality of planter shelves 10, and a base panel 8. The planter shelf 10 type is suited for use with plant tiles' 52 root retaining matrix 50. Elements shown include a camera 76, a panel access/door 95 to the chase enclosure 96 with a mechanical or electrical lock 71, a power generating photovoltaic panel 82, an antenna 73, and a panel identification tag 22. As discussed above, as result of the stacked configuration that is slidingly received between the posts' flanges 3, the weight of all elements in the stack, no matter if it is a plurality of planter shelfs 10 or wall panels 7, a header panel 6 or a base panel 8, will be directed to a below retaining surface substantially without applying vertical loads on the at least two vertical posts 1.

FIG. 6 shows diagrammatically one of several types of fluid irrigation methods of the modular plant cultivation wall 25 system comprising a plurality of planter shelves 10 of the type discussed above. The illustrated method pertains to planter shelves 10 that are substantially horizontally aligned. Irrigation fluid 35 can then flow freely from one planter shelf 10 to another.

The present figure is mostly suited for the plant brick 51 root retaining matrix 50 (not shown in the figure). The diagram shows with indicator arrows the flow direction of fluid 35 within the cultivation wall 25. Fluid 35 originating from inside the irrigation system 30 chase enclosure 96 can flow to a distribution manifold 80 and from there through openings 24 (not shown in the figure) in the post's web 2 into the planter shelf's 10 fluid reservoir 31 (not shown in the figure). Electronic faucets 78 (not shown in the figure) coupled to a control device 83 control the operation of each faucet 78 including at least one of: sequence of irrigation and duration of irrigation. For this, the electronic faucet 78 can be addressable and can be able to communicate with a controller 83 wirelessly or by wire.

In another embodiment, irrigation pipes 32 can originate from the irrigation system 30 disposed inside the irrigation chase enclosure 96 and/or from remote locations. The flow of fluid 35 inside the pipe 32 can be controlled by a manifold 80 and/or electronic faucets 78 (not shown) both coupled at the inside web 2 face of the post 1 (not shown in the figure) that is one of the irrigation chase enclosure 96 walls. The chase enclosure 96 as shown in this figure shows the fluid 35 being dispensed to planter shelves 10 disposed at opposite sides of the chase enclosure 96.

The skilled person realizes that the chase enclosure 96 may have any position along the longitudinal extension of a vertical cultivation wall system 25. It may be arranged at a free end of the cultivation wall 25, but it may also be arranged in a suitable position along the wall. The position is best determined by the total length of the cultivation wall 25. Also, one cultivation wall may be provided with two or more chase enclosures 96 and can have at least one plant cultivation wall 25 coupled and oriented substantially perpendicular to the longitudinal extension of the cultivation wall 25 that includes the chase enclosure 96.

The fluid 35 flowing into the higher elevation planter shelf 10 floods the bottom and rises from the bottom of the fluid reservoir 31 (not shown in the figure) to a set level. Fluid 35 exceeding the level flows onto the adjacent planter shelf 10 through a coupler pipe 34. The coupler pipe 34 can be coupled to an opening 34 in the underside of the fluid irrigation reservoir 31 at one end and at the other end to a through an opening 24 in at least one post's web 2. At the opposite side of the web, the coupling can mirror the same detail. The process can repeat itself irrigating numerous planter shelves 10 where a sensor 77 or a sensor coupled to an electronic faucet 78, typically disposed at an end of the irrigation path, is communicatively coupled a processor/controller 83, wherein the sensor is configured to sense the arrival of fluid 35 and, an electronic faucet 78 can be directed by a processor/controller 83 to let the fluid 35 continue to flow, draining the fluid into a base panel 8 serving as a fluid collector, or close the faucets 78 to flow of fluid at both entry and egress ends. In another embodiment, through an overflow valve 79, the fluid flow can be regulated (not shown) throughout the cultivation wall 25.

The fluid 35 collected at one base panel 8 then flows from that base panel 8 to the next through a coupling pipe 34 (not shown) returning to the irrigation system 30 disposed inside the irrigation system chase enclosure 96. Returning fluid 35 is typically filtered 36 stripped of contaminates and possible undesirable concentrate of minerals. The fluid can further be irradiated by a light source 75 to kill harmful bacteria and viruses and be placed in a holding tank (not shown). The returning fluid 35 can be arranged to mix with plant fluid nutrients 41 and/or pest control additives 42 inside the holding tank 46 or can be infused when exiting the holding tank 46.

FIGS. 7A and 7B show opposite sides of enlarged sections of a planter shelf 10 where fluid 35 enters the fluid reservoir 31 from a pipe spout 33 above an endcap wall 23 and exits to the below.

FIG. 7A shows an irrigation pipe 32 coupled to an electronic faucet 78 that in turn is coupled to a web 2 of a vertical post 1. Fluid 35 flowing through the pipe 32 and the electronic faucet 78 passes through an opening 24 in the web 2 of the vertical post 1 and is dispensed through a pipe spout 33 into the fluid reservoir 31 of the planter shelf 10. Alongside the fluid 35 passage through the web 2 of a vertical post 1, a power/data conductor 70 can enter the planter shelf 10. The present configuration shows the power/data conductor 70 disposed inside a recess formed by the mechanical key 11 of the planter shelf 10. Both the pipe spout 33 and the power/data conductor 70 can be concealed under a pipe/power/data cover 14. The fluid 35 inside the fluid reservoir 31 is shown contained inside the bottom wall flange 20 with an endcap wall 23 coupled. Inside the fluid reservoir 31 a plant brick 51 root retaining matrix 50 is shown partially submerged in irrigation fluid 35. FIG. 7B shows the opposite side of the planter shelf 10. Fluid 35 rising from below inside the fluid reservoir 31 reaches a set level and then flows through an overflow opening 24 at the bottom of the fluid reservoir 31 to the below. The fluid 35 set level can be set by a stem pipe 37 with or without an adjustable height configurator and may be coupled to a filter 36. Inside the fluid reservoir 31 a plant brick 51 root retaining matrix 50 is shown partially submerged in irrigation fluid 35. The fluid 35 exiting can be channeled through a web 2 of a vertical post 1 to the next adjacent planter shelf 10 by at least one coupler pipe 34. The present figure shows two coupler pipes 34 coupled to a common web 2 of the vertical post 1 forming the fluid 35 passage from one planter shelf 10 to the next. The planter shelf 10 is of the type previously discussed and that may be an integral part of the modular cultivation wall 25 disclosed in FIG. 1.

FIGS. 7C and 7D show opposite sides of enlarged sections of a planter shelf 10 where piped pressurized 43 fluid 35 enters and exits the fluid reservoir 31 from a position above the endcap walls 23.

FIG. 7C shows an irrigation method wherein irrigation fluid inside a pipe 32 is conveyed from a remote location and/or an adjacent irrigation system 30 chase enclosure 96 to a fluid distribution manifold 80 and through a web 2 of a vertical post 1 to the interior of a planter shelf 10. A pressurized pipe 43 with at least one emitter nozzle 45 is disposed at the bottom of the fluid reservoir 31 of the planter shelf 10. The pressurized pipe 43 is coupled at both ends to a pipe coupler 34. One pipe coupler 34 delivers fluid to the pressurized pipe while the other pipe coupler 34 conveys fluid 35 from the pressurized pipe 42 through the web 2 in the post 1 to another planter shelf 10. In another embodiment, the pressurized pipe 43 can couple to through couplers 34 coupled to the post web 2 walls. The irrigation pipe coupling configuration can be the same or similar at both ends of the planter shelf 10. The coupler pipes can be installed after placing the planter shelves 10 in place. Further, the pressurized pipe 43, can be configured to approximate the length of the planter shelf 10 and can be shipped coupled to the planter shelf 10 ready for quick install. Alongside with the fluid 35 passage through the web 2 of a vertical post 1, a power/data conductor 70 can enter the planter shelf 10. The present figure shows the power/data conductor 70 disposed inside a recess formed by the mechanical key 11 of the planter shelf 10. Both the pressurized pipe 43 and the power/data conductor 70 can be concealed under a pipe/power/data cover 14. The fluid 35 inside the fluid reservoir 31 is shown contained inside the bottom wall flange 20 with an endcap wall 23 coupled. Inside the fluid reservoir 31 a plant brick 51 root retaining matrix 50 is shown partially submerged in irrigation fluid 35. FIG. 7D shows the opposite side of the planter shelf 10. The connectivity detail for the fluid 35 and/or the power/data 70 can be the same but mirrored to the detail shown for the fluid 35 and the power/data 70 inside the planter shelf 10. The fluid 35 and/or the power/data 70 conveyance between one planter shelf 10 and an adjacent planter shelf can repeat numerous times. At the end of the last subset on the cultivation wall 25, a sensor 77 coupled or not to an electronic faucet 78 and/or a valve 79 can communicate to the irrigation system 30 controller 83 when fluid 35 presence is sensed. Inside the fluid reservoir 31 a plant brick 51 root retaining matrix 50 is shown partially submerged in irrigation fluid 35. The planter shelf 10 is of the type previously discussed and that may be an integral part of the modular cultivation wall 25 disclosed in FIG. 1.

While the irrigation method of FIGS. 7A and 7B are similar to the one described in FIGS. 7C and 7D, this latter method is unaffected by elevational variation in the mounting height between adjacent planter shelves 10. Fluid 35 inside a pressurized pipe 43 flows across the length of the fluid reservoir 31 emitting fluid through the at least one emitter nozzle 45 and then, continues to flow pressurized fluid to the next planter shelf 10. The present method is more suitable for sloped terrain. The downstream end condition can be the same or similar to the configuration described in FIGS. 7A and 7B. There, a drain valve/electronic faucet 79, 78 can be coupled to each of the planter shelves' 10 bottom surfaces at the same location where the pipe coupler 34 is shown with the other method.

Both of the above irrigation methods can employ at least one of: electronic faucets, a fluid manifold 80, a valve 79, and a sensing device 77, wherein at least one of said devices can couple to the irrigation system controller 83.

FIGS. 8A and 8B show a longitudinal and a transverse section of a plant shelf 10 and FIG. 8C shows a partial perspective of a planter shelf 10 with the plant brick root retaining matrix where fluid is dispensed from above a plant brick 51. The planter shelf 10 is of the type previously discussed and that may be an integral part of the modular cultivation wall 25 disclosed in FIG. 1.

FIG. 8A shows a longitudinal section through a planter shelf 10 with fluid reservoir 31. Plant bricks 51 placed inside the fluid reservoir 31 are shown immersed in irrigation fluid 35. The irrigation fluid 35 enters the planter shelf 10 through the web 2 of a post 1 and dispenses the fluid 35 from above the plant brick 51 into the fluid reservoir 31. The fluid 35 flow into the planter shelf 10 can be controlled from the opposite side post's 1 web 2 by means of at least one of: an electronic faucet 78, a manifold 80, or simply by gravity pressure with a controlling valve 79 (not shown).

In addition, at least one power or power and data conductor 70 can extend from end to end of the planter shelf 10 typically concealed inside recesses formed by the elongated planter shelf mechanical keys 11. The present figure shows a sensing conductor coupled to a joiner on the other side of the post's 1 web 2 extending through a recess in the floor of the fluid reservoir 31 and appearing at the opposite end of the planter shelf 10 coupling to the next post's 1 web 2. In this present configuration the power/data conductor 70 couples to a moisture probe 85 embedded into a plant brick 51. In a different configuration the power/data conductor 70 can be at the underside of the fluid reservoir 31 with the probe protruding through from below.

The fluid reservoir 31 is defined by the full height side wall 13 of the planter shelf 10, the short side wall 12, the planter shelf bottom wall flange 20 and two endcap walls 23 disposed at opposite ends of the planter shelf 10. Also, at the ends of the planter shelf 10, a pipe/power/data conductor cover 14 can be placed over the fluid irrigation outlet pipe spout 33 and a power or power and data conductor 70 to protect the elements from tampering and/or debris.

The plant brick 51 shown includes recess apertures 53 that are configured to receive seed or plant basket 54. The size of the basket 54 inside the plant brick 51 is preferably contingent on the type of plant's specific needs including the planter shelf 10 height, and the clear dimensions of the planter shelf fluid reservoir 31. The brick's recess aperture 53 can be configured to fall within standard commercial plant baskets commonly available in home and garden stores.

FIG. 8B shows a transverse section through the planter shelf 10. The elements shown include a light source 75 concealed at a longitudinal recess that is formed by the mechanical key 11 between a top wall flange 19 and a bottom wall flange 20 of two planter shelves 10, a fluid outlet pipe spout 33 covered by the pipe/power/data conductor cover 14, a plant brick 51, with a seed/plant basket coupled 54 inside a recess aperture 53, irrigation fluid 35, a data conductor 70 with a moisture sensor 85, and a post's 1 web 2 and flanges 3 beyond.

FIG. 8C shows a partial perspective of the planter shelf 10 assembly disposed between two flanges 3 of a post 1. A plant brick 51 is shown inside the fluid reservoir 31 with a seed/plant basket 54 seated inside a recess aperture 53 on the planter brick 51 top surface. Below the plant brick 51, a power and/or data conductor 70 is extending along an elongated opening that is formed by the mechanical key 11 between a top wall flange 19 and a bottom wall flange 20 of two planter shelves 10. The fluid pipe spout 33 and the power and data conductor 70 are shown coupled to the web 2 of the post 1. Inside the planter shelf 10, the full height side wall 13, the short side wall 12, and the endcap wall 23 of the planter shelf 10 are shown with the fluid spout 33 and pipe/power/data conductor cover 14 removed to the side.

FIGS. 9A and 9B show a longitudinal and a transverse section and FIG. 9C shows a partial perspective of a planter shelf 10 with the plant brick 51 root retaining matrix 50 where fluid is piped and dispensed from below a plant brick 51. The planter shelf 10 is of the type previously discussed and that may be an integral part of the modular cultivation wall 25 disclosed in FIG. 1.

FIG. 9A shows a longitudinal section through a planter shelf 10 with fluid reservoir 31. Plant bricks 51 placed inside the fluid reservoir 31 are shown immersed in irrigation fluid 35. In this embodiment, an irrigation fluid 35 pressurized pipe 43 is coupled to the vertical post's webs 2 disposed at opposing sides of the planter shelf 10 and submerged inside an elongated recess formed by the mechanical key 11 of the planter shelf 10. The pressurized pipe 43 length approximates the length of the planter shelf 10 and for quick installation, can be factory pre-installed with couplers at its ends. The pressurized pipe 43 is seated on clamps that are coupled to the planter shelf 10 bottom wall flange 20 and spaced apart. The pressurize pipe has at least one emitter nozzle 45 opening to dispense fluid 35 into the fluid reservoir 31. The fluid 35 flow into the planter shelf pressurized pipe 43 can be controlled from the opposite side post's web 2 by means of at least one of: an electronic faucet 78, a manifold 80, or simply by gravity pressure with a controlling valve (not shown).

In addition, at least one power or power and data conductor 70 can extend from end to end of the planter shelf 10 typically concealed inside the recesses formed by the elongated planter shelf 10 mechanical keys 11. The present figure shows a power/data conductor 70 disposed parallel to the pressurized pipe 43 inside a mechanical key 11 of the planter shelf 10. In other embodiments the power/data conductor 70 can be coupled to the bottom side of the top wall flange 19. The power/data connectors can be coupled at both ends to reciprocating receptacles that are coupled to the posts' webs 2. The receptacle connector can be a single double-sided joiner also factory pre-installed.

The power/data conductor 70 can extend through a concealed recess in the fluid reservoir 31 reappearing at the opposite end of the planter shelf 10 coupling to the next post's web 2. In this present configuration as shown in FIG. 9B, the power/data conductor 70 couples to a moisture probe 85 embedded into a plant brick 51. In a different configuration the conductor can be at the underside of the fluid reservoir with the probe 85 protruding through from below. The power/data conductor 70 can be placed in a concealed recess at the top flange 19 of the planter shelf 10 energizing at least one light source 75.

The fluid reservoir 31 is defined by the full height side wall 13 of the planter shelf 10, the short side wall 12, the planter shelf bottom wall flange 20 and two end cap walls 23 disposed at opposite ends of the planter shelf 10. Also, at the ends of the planter shelf 10, a pipe/power/data conductor cover 14 can be placed over the fluid irrigation outlet pipe spout 33 and a power or power and data conductor 70 to protect the elements from tampering and/or debris.

The plant brick 51 shown include recesses aperture 53 that receive seed or plant basket 54. The size of the basket 54 inside the plant brick 51 is contingent on the type of plant's specific needs including the planter shelf 10 height, and the clear dimensions of the planter shelf fluid reservoir 31. The brick's recess aperture 53 can be configured to fall within standard commercial plant baskets commonly available in home and garden stores.

FIG. 9B shows a transverse section through the planter shelf 10. The elements shown include a light source 75 concealed in a longitudinal top wall flange 19 recess formed by the mechanical key 11 of the planter shelf 10. The pressurized pipe 43 is also shown below the plant brick 51 and beyond coupling to the post's web 2. The figure shows in dash lines a pipe/power/data conductor cover 14, a plant brick 51 with a seed/plant basket 54 coupled, irrigation fluid 35 inside the fluid reservoir 31, a data conductor 70 with a moisture sensor 85 coupled, and a post's web and flanges beyond.

FIG. 9C shows a partial perspective of the planter shelf 10 assembly disposed between two flanges 3 of a post 1. A plant brick 51 is shown inside the fluid reservoir 31 with a seed/plant basket 54 seated inside a recess aperture 53 of the plant brick 51 top surface. Below the plant brick 51, a power and/or data conductor 70 extends through a mechanical key 11 elongated recess opening. The pressurized pipe 43 and the power and data conductor 70 are shown coupled to the web 2 of the post 1. The section of the planter shelf 10 shows the full height web wall 13, the short web wall 12, the fluid reservoir endcap wall 23, and the bottom surface of the fluid reservoir 31. The pressurized pipe 43 and the power/data conductor 70 are shown exposed with the pipe/power/data cover 14 shown removed to the side.

Figure 10:
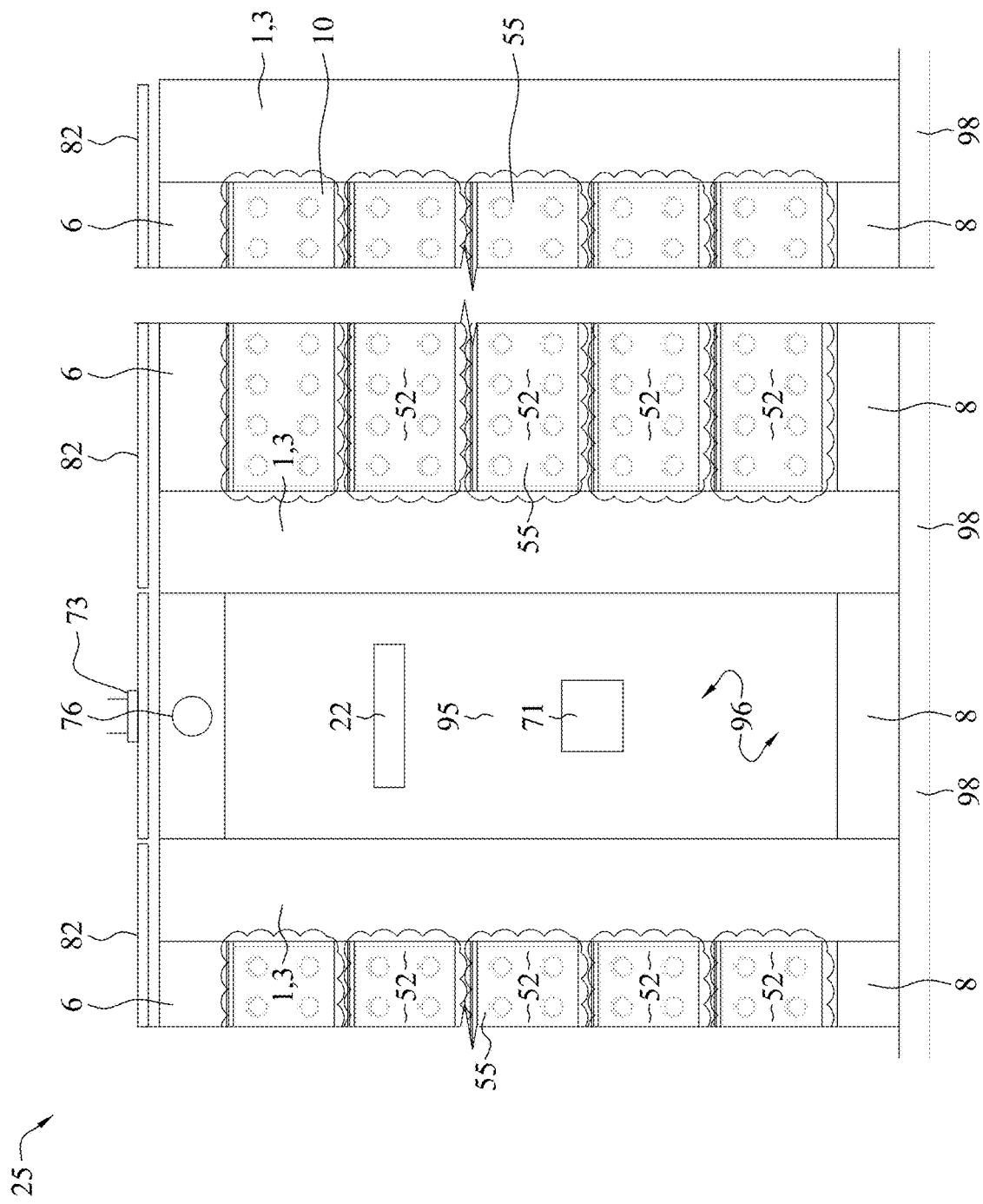
FIG. 10 shows a partial elevation of the modular vertical cultivation wall of the plant tile with an integral irrigation system chase enclosure.

FIG. 10 shows a partial elevation of the modular vertical cultivation wall 25 of the plant tile 52 with an integral irrigation system chase enclosure 96. The cultivation wall 25 with its components has the overall same design as the modular cultivation wall 25 disclosed in FIG. 1.

The chase enclosure 96 of the irrigation system 30 is shown disposed between two posts 1. Partial cultivation wall 25 assembly are positioned between the posts' flanges 3. In the present figure the assembly comprise header panels 6, planter shelves 10 and base panel 8. The planter shelf 10 type is suited for use with plant tile' 52 root retaining matrix 50.

Elements shown include a camera 76, a panel access/door 95 to the enclosure interior with a mechanical or electrical lock 71, a power generating photovoltaic panel 82, an antenna 73, and a panel identification tag 22. The cultivation wall 25 assembly is anchored to a ground retaining surface 98.

The present figure shows the partial planter shelves' 10 vertically disposed tiles 52 populated by plant 55 material In the following, examples of possible irrigation methods will be described and exemplified. The different methods may in full or in part be combined with each other. Also, the skilled person realizes that one and the same cultivation wall may be provided with a combination of different irrigation methods.

Figure 11:
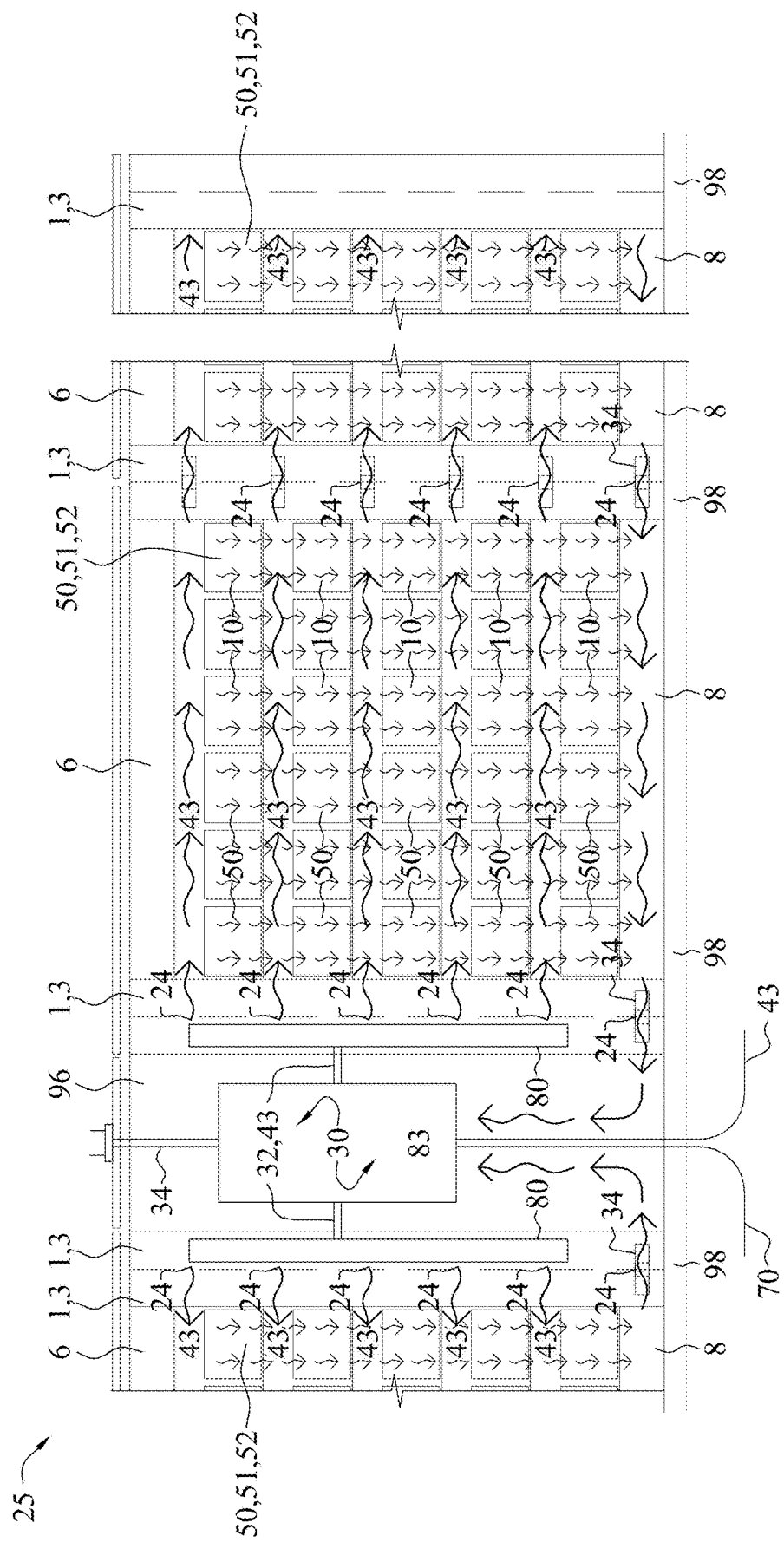
FIG. 11 shows an exemplary irrigation fluid flow diagram of the plant tile cultivation wall with an integral irrigation system housed in a chase enclosure.

FIG. 11 shows an exemplary irrigation fluid flow method of the plant tile 52 cultivation wall 25 with an integral irrigation system 30 housed in a chase enclosure 96. More specifically this method pertains to a wall of planter shelves 10 that are not necessarily horizontally aligned. Fluid 35 under pressure can be emitted to seed and/or plant root retaining matrix 50 inside planter shelves 10 of same or different mounting elevations. The irrigation system 30 is directly applicable to the modular cultivation wall 25 disclosed in FIG. 1.

The present figure is mostly suited for the plant tile 52 root retaining matrix 50. The diagram shows with indicator arrows the flow direction of fluid 35 within the cultivation wall 25. Pressurized fluid 35 originating from inside the irrigation system 30 chase enclosure 96 can flow to a distribution manifold 80 and from there through an opening 24 in the post's web 2 onto at least one seed and/or plant root retaining matrix 50 coupled to the planter shelf's 10 and disposed above or on the fluid reservoir 31. In one embodiment of a manifold 80, electronic faucets 78 are coupled to a control device 83 that controls the operation of at least one dedicated electronic faucet 78 that irrigates an array of planter shelves 10. The controller 83 operations can include at least one of: sequence of irrigation and duration of irrigation. For this reason, the electronic faucet 78 can be addressable and can be able to communicate with the controller 83 wirelessly or by wire.

The present embodiment shows the pressurized fluid pipe 32 coupled to the bottom side of the planter shelf's 10 top wall flange 19. The pressurized pipe 43 can be placed in a recess formed by the planter shelf's 10 mechanical key 11 between a top wall flange 19 and a bottom wall flange 20 of two planter shelves 10. The pressurized pipe 32 can extend the length of the planter shelf 10 having at least one emitter nozzle 45 and couple to post webs' 2 openings 24 at the opposite ends of the planter shelf 10. Pressurized fluid 35 than can freely flow from one planter shelf 10 to another.

Fluid 35 dispensed inside the planter shelf 10 irrigates the seed and/or plant root retaining matrix 50 from above. The fluid 35 flows through the root retaining matrix 50 to a shallow fluid reservoir 31 below and then drains through at least one opening 24 to the below. The present figure shows a base panel 8 that can collect the drained fluid 35 from the above. The fluid 35 collected by the base panel 8 then can flow from one base panel 8 to the next through a coupling pipe 34 returning to the irrigation system 30 disposed inside the irrigation system 30 chase enclosure 96.

Returning fluid 35 is typically filtered stripped of contaminates and possible undesirable concentrate of minerals, then is irradiated to kill harmful bacteria and viruses and placed in a holding tank 46. The returning fluid can mix with plant fluid nutrients 41 and/or pest control additives 42 inside the holding tank 46 or can be infused when exiting the holding tank 46. In another embodiments (not shown), the returned fluid can be re-cycled in a remote location or discarded/hauled away.

In another embodiment (not shown), irrigation pipe/s 32 can originate from an irrigation system 30 disposed at a remote location. Pressurized irrigation fluid 35 inside a pipe/s 32 can be couple to at least one opening 24 in a starter post web 2 and from there, through openings in a plurality of post webs 2 opening 24, irrigate a plurality of planter shelves 10. In this configuration the manifold 80 can be only mechanical. Yet in another configuration, the cultivation wall 25 irrigation system 30 can be configured to comprise of a combination of elements wherein at least one element is remotely disposed while another is disposed inside the chase enclosure 96.

FIGS. 12A and 12B show enlarged top and bottom sections of opposite sides of a planter shelf 10 fluid 35 ingress and egress inside the cultivation wall 25. In these figures, the fluid irrigates a plant tile 52 root retaining matrix 50.

FIG. 12A shows an irrigation method wherein irrigation fluid 35 inside a pipe 32 is conveyed from a remote location and/or an adjacent irrigation system 30 chase enclosure 96 (not shown) through an electronic faucet 78 across a web 2 of a vertical post 1 opening to the interior of a planter shelf 10. A pressurized pipe 43 with at least one emitter nozzle 45 is longitudinally coupled to the bottom face of the top wall flange 19 of the planter shelf 10. The pressurized pipe 43 is coupled at both ends to a threaded through stem pipe 37 that is secured to the web 2 of the vertical post 1 from both sides. The pressurized pipe 43 conveys fluid 35 through the web 2 in the post 1 to the adjacent planter shelf 10 downstream. In another embodiment, the pressurized pipe 43 can couple to through couplers 34 coupled to the post web 2 walls.

The irrigation pressurized pipe 43 coupling configuration can be the same or similar at both ends of the planter shelf 10. The threaded through stem pipes 37 can be installed after placing the planter shelves 10 in place. Further, the pressurized pipe 43 can be configured to approximate the length of the planter shelf 10 and can be shipped coupled to the planter shelf 10 ready for quick install. Alongside the fluid 35 passage through the web 2 of a vertical post 1, a power/data conductor 70 can enter the planter shelf 10 and can extend the length of the planter shelf 10. The present figure shows the power/data conductor 70 disposed inside a recess formed by the mechanical key 11 of the planter shelf 10. Both the pressurized pipe 43 and the power/data conductor 70 can be concealed inside a pipe/power/data cover 14.

The fluid 35 inside the fluid reservoir 31 is shown contained inside the top wall flange 19. The fluid reservoir 31 in this figure is shown below a plant tile 52 root retaining matrix 50. The fluid reservoir 31 of the planter shelf 10, having an opening to the above, is defined by a short side wall 12, a full height wall 13, at least two end cap walls 23 coupled to ends of the elongated planter shelf 10 or to the top surfaces of the fluid reservoir 31 enclosure. The top surface of the bottom wall flange 20 and the top surface of the top wall flange have at least one reciprocating through opening 24, to the below. The opening can be a weep hole 39. The planter shelf 10 is coupled to at least one of: another planter shelf 10 and a base panel 8. Both the other planter shelf 10 and the base panel 12 can have reciprocating opening/s 24, 39 for fluid 35 to drain downwardly. In the present configuration, irrigation fluid 35 drains from above, flows through the plant tile 52 into the fluid reservoir 31. From there, by means of at least one through bore 24 weep hole 39, the fluid 35 flows down onto and through the root retaining plant matrix 50 below until collected at the bottom disposed base panel 8. The number of weep hole 39 openings 24 and their diameter defines the flow rate of fluid 35 from the fluid reservoir 31 to the below. Fluid 35 arriving at the base panel 8 can be pumped 84 (not shown) back and recycled through the irrigation system 30.

The present figure shows coupler pipes 34 coupled below the ground retaining surface 98 to the bottom surface of the base panel 8 and a common post's web 2 with a through bore 24. This configuration is one of several configurations to convey the drained irrigation fluid 35 from one section of the cultivation wall 25 to the next. Further, this figure does not show access door to clean the interiors of the base panel 8. It should be assumed that a clean-up access door can be configured to couple to at least one of: a vertical wall of the base panel 8 and the top surface of the base panel 8 coupled to the bottom flange wall 19 of the planter shelf 10. The present irrigation method is also suited to irrigate plant brick 51.

FIG. 12B shows the opposite side of the planter shelf 10. The connectivity detail for the fluid 35 and/or the power/data 70 can be the same but mirrored to the detail shown for the fluid 35 and power/data 70 inside the planter shelf 10 with the exception of the end condition. The fluid 35 and/or power/data 70 conveyance between one planter shelf 10 and/or an adjacent planter shelf can repeat numerous times. At the downstream end condition by the most remote vertical post 1 from the fluid 35 origination point of entry to the cultivation wall 25, both the pressurized pipe 43 and the power/data conductor 70 terminate. At the end of the last subset on the cultivation wall 25, a sensor 77 coupled or not to an electronic faucet 78 and/or a valve 79 can communicate to the irrigation system 30 controller 83 when fluid 35 presence is sensed. Inside the fluid reservoir 31 a plant tile 52 root retaining matrix 50 is shown disposed above the fluid reservoir 31. The planter shelf 10 is of the type previously discussed and that may be an integral part of the modular cultivation wall 25 disclosed in FIG. 1.

The irrigation method shown in FIGS. 12A and 12B is unaffected by elevational variation in the mounting height between adjacent planter shelves 10. Fluid 35 inside a pressurized pipe 43 flows across the length of the fluid reservoir 31 to the opposite end and then, continues to flow pressurized fluid 35 to the next planter shelf 10. The present method is suitable for sloped terrain. The pressurized pipe 43 and/or the power/data conductor 70 terminate at the downstream end without or with at least one of: a sensing device 77 and a communicating device 72. The above irrigation methods can employ at least one of: electronic faucets 78, a fluid manifold 80, a valve 79, a sensing device 77, and a communication device 72 wherein at least one of said devices can couple to the irrigation system controller 83 and other IOT devices. The planter shelf 10 as such has the same overall design as that previously discussed above and which is intended to be part of the modular cultivation wall 25 disclosed in FIG. 1.

FIGS. 12C and 12D show enlarged top and bottom sections of opposite sides of a planter shelf 10 fluid 35 ingress and egress inside the cultivation wall 25. In these figures, the fluid irrigates a plant brick 51 root retaining matrix 50.

The views show top and bottom configurations for both sides. FIG. 12C shows a header panel 6 irrigation method configured to divide a cultivation wall 25 to subset wall sections, wherein each wall section can comprise at least one of: a header panel 6, a planter shelf 10, and a base panel 8. In a different configuration, the section can be comprised of at least one of: a header panel 6 and a planter shelf 10. These are of the very same type as previously described above.

FIG. 12C shows the fluid 35 entry side of a header panel 6 adapted to become a fluid 35 retaining vessel. As a fluid 35 retaining vessel, the header panel 6 can provide the following utilities: a. Reduce space inside the chase enclosure 96 b. Store irrigation fluid when fluid is scarce c. Establish gravity flow fluid circulation d. Store recycled rainwater e. Store grey water f. Add additional weight on the cultivation wall 25 for compaction purposes.

The longitudinal length of the header panel 6 is configured to approximate the length of the planter shelf 10 with its ends disposed between the same vertical post 1 flanges 3 retaining at least one planter shelf 10 or wall panel 7. The cultivation wall 25 employing the fluid 35 storing/dispensing header panel 6 is configured to rest on at least one of: a planter shelf 10 or a wall panel 7 with a reciprocating elongated recess/protrusion 27 mechanical key 11 to the planter shelf 10 below. By means of a removable coupler pipe 34 coupled to a vertical post's web 2, piped irrigation fluid 35 under pressure enters the planter shelf 10 and couples to the bottom side of the header panel 6 from below. The fluid 35 entering can then flow from end to end of the header panel 6 having a coupled filtered 36 vent (a breather) to the exterior, equalizing the air pressure inside. An electronic faucet 78 coupled to at least one of: the header panel 6 and the top wall flange 19 of the planter shelf 10 is tasked with irrigating the planter shelves 10 section of the cultivation wall 25 disposed between the opposing sides vertical posts 1.

By signal from the irrigation system controller 83, the electronic faucet 78 lets fluid 35 flow into the fluid reservoir 31 of the planter shelf 10 below. The fluid 35 then flows across the fluid reservoir 31 irrigating seed and/or plant root retaining matrixes 50. The fluid 35 rising from below inside the fluid reservoir 31 reaches a set level and then flows through an overflow opening 24 at the bottom of the fluid reservoir 31 to the below. The fluid 35 set level can be set by a stem pipe 37 with or without an adjustable height configurator and may be coupled to a filter 36. The fluid 35 then flows across the fluid reservoir 31 to the opposite side of the planter shelf 10 irrigating seed and/or plant root retaining matrixes 50 in its path. There, the same type opening 24 to below drains the fluid 35 exceeding the pre-set fluid 35 level. The flow of fluid 35 proceeds from the higher to the lower disposed planter shelf 10.

The bottom planter shelf 10 in the present figure is shown coupled from below to a base panel 8. The bottom of the planter shelf 10 also referred to herein as the bottom wall flange 20 is configured to rest on a base panel 8 top surface, with each having a reciprocating elongated recess/protrusion 27 mechanical key 11 keyed. Fluid 35 can egress the bottom planter shelf 10 from at least one opening 24, flowing drained irrigation fluid 35 into the base panel 8. At least one of: the bottom planter shelf 10 and the base panel 8 is coupled to a sensor 77 that can communicate 72 to at least one of: an electronic faucet 78 and/or a valve 79 coupled to the header panel 6 of the subset and/or the irrigation system controller 83 when fluid level reaches a set level. When the fluid 35 reaches the set level, a controlling device 83 can direct the electronic faucet 78 to shut off.

The present figure shows coupler pipes 34 coupled below the ground retaining surface 98 to the bottom surface of the base panel 8 and a common post's web 2 with a through bore 24. This configuration is one of several configurations to convey the drained irrigation fluid 35 from one section of the cultivation wall 25 to the next. Further, this figure does not show access door to clean the interiors of the base panel 8. It should be assumed that a clean-up access door can be configured to couple to at least one of: a vertical wall of the base panel 8 and the top surface of the base panel 8 coupled to the bottom flange wall 19 of the planter shelf 10.

FIG. 12D shows the fluid 35 exit side to an adjacent header panel 6 of a header type panel 6 adapted to become a fluid 35 retaining vessel. Both header panels 6 are shown to be disposed over a planter shelf 10. The header panels' 6 ends are disposed between common vertical post 1 flanges 3 that retain the header posts 6 from the opposite sides of the vertical post 1 common web 2. The present figure shows a through coupler pipe 34 secured to the common web 2 from both sides. Coupler pipes 2 are shown extending from the header panels 6 to the web 2 on both sides of the common web 2. Through the coupler pipes 34 irrigation fluid 35 is conveyed to a header panel 6 and from a header panel 6 to a downstream header panel 6. The fluid 35 level can equalize under Pascal's Law or, when the terrain is sloped, a back flow valve 79 (not shown) can be added.

As described in FIG. 12C, the fluid 35 in each header panel 6 corresponds to a subset of planter shelves 10 disposed below. The fluid 35 then flows across the fluid reservoir 31 irrigating seed and/or plant root retaining matrixes 50. The fluid 35 rising from below inside the fluid reservoir 31 reaches a set level and then flows through an opening 24 at the bottom of the fluid reservoir 31 to the below. The fluid 35 set level can be set by a stem pipe 37 with or without an adjustable height configurator and may be coupled to a filter 36. The stem pipe 37 can be extended inside the planter shelf 10 to avoid splattering the fluid 35. The fluid 35 then flows across the fluid reservoir 31 to the opposite side of the planter shelf 10 irrigating seed and/or plant root retaining matrixes 50 in its path. There, an opening 24 to below drains the fluid exceeding the pre-set fluid 35 level. The flow of fluid 35 proceeds from the higher to the lower disposed planter shelf 10. The fluid 35 flows from one end of the planter shelf 10 to the opposite end where an overflow stem pipe 37 drains the fluid 35 to a lower tier planter shelf 10 until the fluid 35 reaches the base panel 8. The flow of the fluid 35 from the base panel 8 is discussed in FIG. 12C. The planter shelf 10 as such has the same overall design as that previously discussed above and which is intended to be part of the modular cultivation wall 25 disclosed in FIG. 1.

FIGS. 13A and 13B show a longitudinal and a transverse section and FIG. 13C shows a partial perspective of a planter shelf 10 with the plant tile 52 root retaining matrix 50 coupled to the planter shelf 10 full height side wall 13. This has previously been discussed e.g. with reference to FIGS. 31 and 4F. The planter shelf 10 as such has the same overall design as that previously discussed above and which is intended to be part of the modular cultivation wall 25 disclosed in FIG. 1.

FIG. 13A shows a longitudinal section through a planter shelf 10 with fluid reservoir 31. The present figure shows the plant tiles 52 placed on and inside the fluid reservoir 31 and coupled to the full height side wall 13 of the planter shelf 10. Pressurized irrigation fluid 35 enters the planter shelf 10 through a post's web 2 and dispenses the fluid 35 from above through at least one fluid emitter nozzle 45. The fluid 35 emitted flows through the seed and/or plant root retaining matrix 50 to the fluid reservoir 31. The fluid 35 flowing into the planter shelf 10 in the present embodiment figure shows a manifold 80 at the opposite side of the post's web 2 controlling the planter shelf/eves 10 fluid 35 intake. Other embodiments can include at least one of: an electronic faucet 78, a manifold 80 with at least one electronic faucet 78, pressurized fluid 35 flow by gravity and/or pressurized fluid 35 received from a remote location. (not shown).

The fluid reservoir 31 is defined by the full height side wall 13 of the planter shelf 10, the short side wall (Not shown), the planter shelf bottom wall flange 20 and two side endcap walls 23 disposed at opposite ends of the planter shelf 10. Also, at the ends of the planter shelf 10, a pipe and power/data cover 14 can be placed over the fluid irrigation inlet/outlet and/or the power/data conductor/s 70 (not shown) to protect the elements from being tampered with and/or debris.

The plant tile 52 shown can include recesses aperture 53 that receive seed or plant basket 54. The size of the basket 54 inside the tile's recessed aperture 53 is contingent on the type of plant's 55 specific needs including the planter shelf 10 height, and the clear dimensions of the planter shelf fluid reservoir 31. The tile's recessed aperture 53 can be configured to fall within standard commercial plant baskets 54 commonly available in home and garden stores.

FIG. 13B shows a transverse section through the planter shelf 10 with plant tile 52 coupled. The elements shown from the top wall flange 19 down include: a pressurized pipe 32 and a power and/or data conductor/s 70 that can be concealed inside a longitudinal recess formed by the mechanical key 11 of the planter shelf 10, at least one weep hole 39 through opening 24 for fluid 35 to drain from the above, a plant tile 52 coupled to the full height side wall 13 of the planter shelf 10, a plurality of recessed apertures 53 inside the plant tile 52 root retaining matrix 50 configured to receive seed/plant basket 54, a fluid reservoir 31 defined in this figure by the full height side wall 13 and the short side wall 12 and the top surface of the bottom wall flange 20, and weep holes 39 through openings 24 extending from the top surface of the bottom wall flange 20 to the bottom surface of the top wall flange 19 coupled below. The fluid 35 draining from the bottom of the plant tile 52 into the fluid reservoir 31 then flows to the planter shelf 10 or a base panel below through said weep holes 39.

FIG. 13C shows a partial worm view perspective of the planter shelf assembly disposed between two flanges 3 of a post 1. A plant tile 52 is shown inside the fluid reservoir 31 with a seed/plant baskets 54 seated inside recessed apertures 53 disposed on the planter tile's 52 top surface. Above the plant tile 52, a power and/or data conductor 70 and fluid pipe 32 are shown disposed inside mechanical keys' 11 elongated recess opening. The power/data conductor/s 70 and the fluid 35 pipe 32 are shown coupled to the post's web 2 with a pipe/power/data cover 14 extended to the side. The cover 14 conceals the connection to protect the elements from being tampered with and/or debris. Extending outwardly from the full height side wall 13 are two latching/hooking devices 16 and at the bottom, the bottom wall flange 20 bottom surface is shown with a plurality of weep holes 39 unitarily coupled to a short side wall 12.

Figure 14:
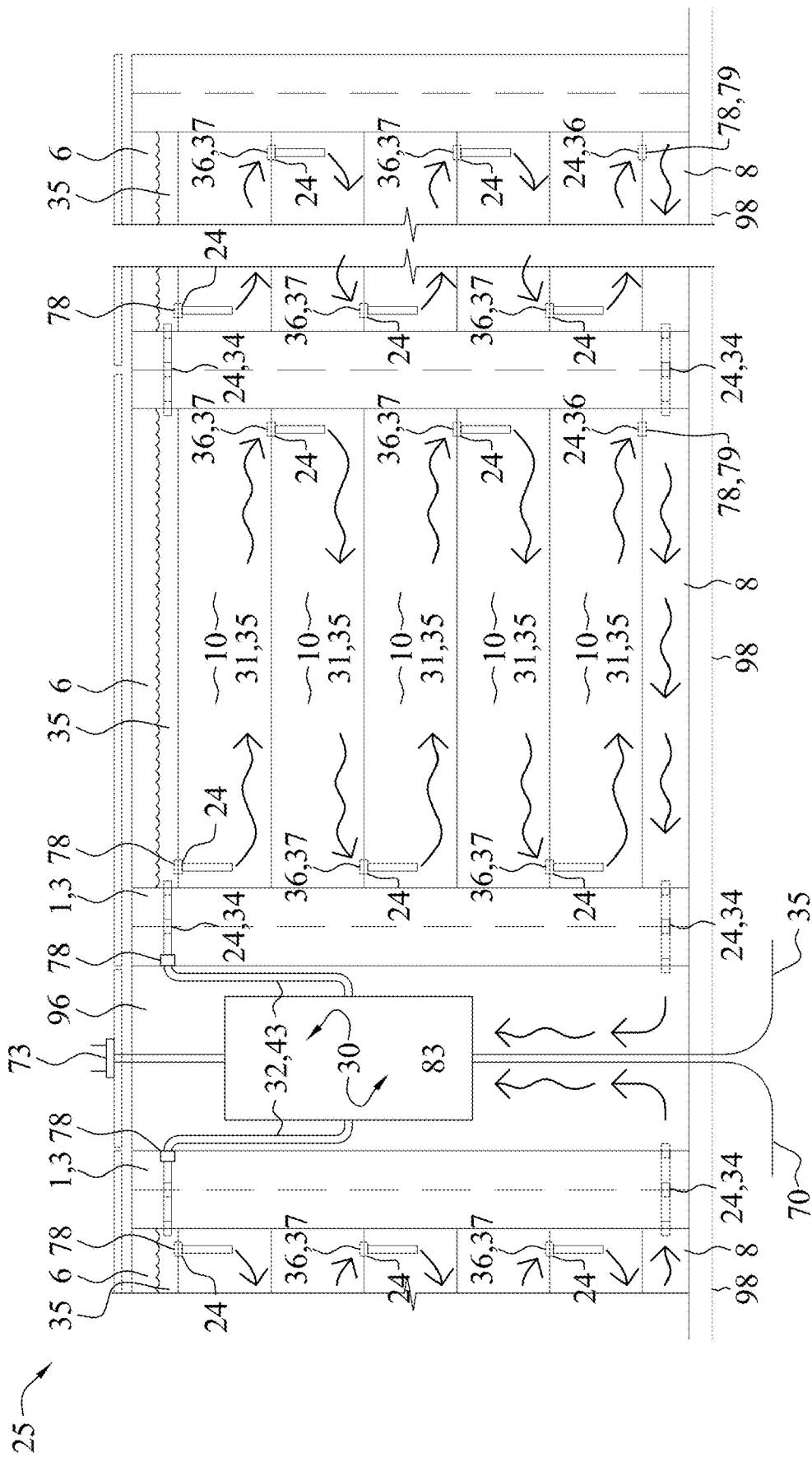
FIG. 14 shows an exemplary irrigation fluid flow diagram of the plant brick and/or tile cultivation wall with an integral irrigation system housed in a chase enclosure and irrigation fluid stored in a header panel.

FIG. 14 shows an exemplary irrigation fluid flow method of the plant brick 51 and/or tile 52 plant cultivation wall 25 with an integral irrigation system 30 housed in a chase enclosure 96 and irrigation fluid 35 stored in a header panel 6. The diagram and method to be described below is directly applicable to the modular cultivation wall 25 disclosed in FIG. 1.

The diagram shows a header panel 6 containing the plant irrigation fluid 35 disposed above the plant cultivation wall 25. The present irrigation method is configured to flow irrigation fluid 35 by gravity to the below irrigating at least one seed and/or plant retaining matrix 50 in its path. The irrigation fluid 35 can remain in the at least one planter shelf 10 fluid reservoir 31 or be drained and re-cycled. The present diagram shows the path of the fluid 35 confined to planter shelves 10 disposed between two vertical post flanges 3 at opposing ends wherein fluid 35 ingress and egress is through the post webs 2 of at least two of the header panels 6.

This preferred irrigation method resolves changes in sloped terrains while maintaining the plant cultivation wall 25 planter shelves 10 and panels 6, 7, 8 plumb. Also shown at an opposite side of one of the posts 1 is an irrigation system 30 chase enclosure 96. Irrigation fluid originating from the chase enclosure 96 can be configured to irrigate plants 55 from at least two sides of the enclosure 96 and back and front of the cultivation wall 25.

The present figure is mostly suited for the plant brick 51 root retaining matrix 50. Indicator arrows show the flow direction of fluid 35 within the cultivation wall 25. Fluid 35 originating from inside the irrigation system 30 chase enclosure 96 can flow to an electronic faucet 78 and from there through an opening 24 in the post's web 2 couple to a coupler pipe 34 that couples to at least one header panel 6. The header panel 6 is configured to at least in part to contain the irrigation fluid 35. From the header panel 6, the irrigation fluid 35 can continue flowing through a coupler pipe/s 34 through vertical post web opening 24 to an adjacent header panel 6 and/or flow to at least one planter shelf 10 disposed below.

An electronic faucet 78 coupled to preferably the bottom face of the header panel 6 is configured to flow irrigation fluid 35 into the planter shelf 10. The electronic faucet 78 can be controlled by wire or wirelessly. The irrigation fluid 35 from the header panel 6 flows into the fluid reservoir 31 and is absorbed by the seed and/or plant root retaining matrix 50. At an opposite end to the end the irrigation fluid 35 entered from, an opening 24 in the bottom surface of the fluid reservoir 31 permits fluid flow the planter shelf 10 below. The opening 24 in the fluid reservoir 31 can be elevated to hold minimal amount of fluid 35 by a stem pipe 37 with a filter 36 maintaining an acceptable irrigation fluid 35 level inside the fluid reservoir 31.

The flow of the irrigation fluid 35 by gravity can irrigated a plurality of planter shelves' 10 seed and/or plant retaining matrixes 50 disposed above one another. A mechanical valve 79 or an electronic faucet 78 coupled to at least one of: a planter shelf 10 and a base panel 6 can transmit a signal to a processor/controller 83 to at least operate one of: maintain, modulate, or turn on/off the irrigation fluid 35 flow through the at least one planter shelf 10 disposed above the base panel 6. In the present configuration, at least one of: the electronic faucet 78 coupled to the header panel 6 and the bottom planter shelf 10 and/or the base panel 6 coupled valve 79 or electronic faucet 78 are communicatively coupled. Other coupled devices inside the planter shelf 10 that can at least send signal to the processor/controller include at least one moisture probe 85. The at least one irrigation controller 83 of the irrigation system 30 can also be communicatively coupled to at least one of: the electronic faucet 78 coupled to the header panel 6 and the bottom shelf and/or the base panel valve 79 or electronic faucet 78.

The controller 83 operations can include at least one of: sequence of irrigation where different sections of the cultivation wall 25 are irrigated at different time, continuous loop slow irrigation where irrigation fluid 35 drained is recycled through the irrigation system 30 and through seed and/or plant root retaining matrix 50 saturation, evacuating the irrigation fluid 35 following a saturation cycle. For this reason, addressable electronic faucet 78 and valves 79 can be used to be to communicate with at least one controller 83.

The irrigation fluid 35 collected by the base panel 8 can flow from one base panel 8 to the next through a coupling pipe 34 returning to the irrigation system 30 disposed inside the irrigation system 30 chase enclosure 96. Returning fluid 35 is typically filtered stripped of contaminates and possible undesirable concentrate of minerals, then is irradiated to kill harmful bacteria and viruses and then circulated back to at least one fluid retaining header panel 6. The returning irrigation fluid 35 can mix with plant fluid nutrients 41 and/or pest control additives 42. In another embodiments (not shown), the returned irrigation fluid 35 can be re-cycled in a remote location or discarded/hauled away.

In another embodiment (not shown), pressurized irrigation pipe/s can originate from an irrigation system 30 disposed at a remote location. Pressurized irrigation fluid 35 inside a pipe/s can be coupled to at least one opening 24 in a starter post web 2 and from there, through openings in a plurality of post webs 2 enter a plurality of fluid retaining header panels 6. The irrigation cycle from the header panel 6 is as described above. Yet in another configuration, the cultivation wall 25 irrigation system 30 can be configured to comprise of a combination of irrigation fluid 35 conveyance, storage and distribution wherein at least one element is remotely disposed while another is disposed inside the chase enclosure 96.

FIGS. 15A and 15B show a longitudinal section and a transverse section. FIG. 15C shows a partial perspective view of a planter shelf 10 with the plant brick 51 root retaining matrix 50 disposed in the fluid reservoir 51 and irrigation fluid 35 stored and dispensed from a header panel 6. The planter shelf 10 as such has the same overall design as that previously discussed above and which is intended to be part of the modular cultivation wall 25 disclosed in FIG. 1.

FIG. 15A shows partial sections of the opposite side of a header panel 6 coupled to a planter shelf 10 from above and a partial section of the same assembly across a common vertical post 1. At the fluid 35 entry side a header panel 6 of a cultivation wall 25 is shown to be adapted to become a fluid 35 retaining vessel. As a fluid 35 retaining vessel, the header panel 6 can provide the following utilities: a. Reduce space inside the chase enclosure 96; b. Store irrigation fluid when fluid is scarce; c. Establish gravity flow fluid circulation; d. Store recycled rainwater; e. Store grey water; f. Add additional weight on the cultivation wall 25 for compaction purposes.

The longitudinal length of the header panel 6 is configured to approximate the length of the planter shelf 10 with its ends disposed between the same vertical post 1 flanges 3 retaining at least one planter shelf 10 or wall panel 7. The cultivation wall 25 employing the fluid 35 storing/dispensing header panel 6 is configured to rest on at least one of: a planter shelf 10 or a wall panel 7 (not shown in the figure) with a reciprocating elongated recess/protrusion 27 mechanical key 11 to the planter shelf 10 below.

Piped irrigation fluid 35 under pressure flows through an opening 24 in the web 2 of the vertical post 1 into a planter shelf 10. There, coupled to a threaded nipple, a pipe coupler 34 extends and couples the to the bottom side of the header panel 6 from below. The fluid 35 entering can then flow from end to end of the header panel 6 having a filtered 36 vent opening 24 (a breather) to the exterior, equalizing the air pressure inside. An electronic faucet 78 disposed in proximity to the fluid intake coupler pipe 34 is shown coupled to at least one of: the header panel 6 and the top wall flange 19 of the planter shelf 10.

By signal from the irrigation system controller 83 (not shown in the figure), the electronic faucet 78 lets fluid 35 flow into the fluid reservoir 31 of the planter shelf 10 below. The fluid 35 then flows across the fluid reservoir 31 irrigating seed and/or plant root retaining matrixes 50. At the opposite side of the fluid reservoir 31, the rising fluid 35 from below reaches a set level and then flows down to a planter shelf 10 below through an overflow opening 24 at the bottom of the fluid reservoir 31. The fluid 35 set level can be set by a stem pipe 37 with or without an adjustable height configurator and may be coupled to a filter 36. The fluid 35 then flows across the fluid reservoir 31 to the opposite side of the planter shelf 10 irrigating seed and/or plant root retaining matrixes 50 in its path. There, the same type of opening 24 to below drains the fluid 35 exceeding the pre-set fluid 35 level. The flow of fluid 35 proceeds from the higher to the lower disposed planter shelf 10.

Also shown at the opposite side of the fluid 35 ingress to the planter shelf 10 is an exemplary method to convey irrigation fluid 35 from one header panel 6 to the next. The present figure shows two partial header panels 6 disposed between the flanges 3 (beyond) of a common vertical post 1. A threaded stem pipe 37 is coupled the web 2 of the common post 1 from both sides. Coupler pipes 34 coupled to the bottom of the header panels 6 at both sides of the vertical post 1, couple to the threaded stem pipe 37 of the post's web 2. Fluid 35 originating from one header panel 6 can flow to the next header panel 6. Where the terrain is sloped, back flow valves 79 can be used to control the fluid 35 volume in the header panels 6.

Alongside the coupler pipes 34 of the fluid 35, a power/data conductor 70 can flow power and/or signal to power consuming devices 86 coupled to the cultivation wall 25. As with other embodiments of the planter shelf 10 cultivation wall 25, a pipe/power/data cover 14 can be placed below the top wall flange 19 of the planter shelf 10 to conceal the coupler pipe 34 and the power/data conductor 70. The cover 14 can be adapted to be placed at the opposite sides of the post web 2 from the $2^{nd}$ to the one post web 2 before the last post 1.

FIG. 15B shows a transverse section of the header panel 6 with a planter shelf 10 coupled below. More specifically, the section shows a view of the header panel 6 fluid 35 receiving end. An electronic faucet 78 is shown coupled to at least one of: the bottom side of the header panel 6 and the top wall flange 19 of a planter shelf 10. Fluid 35 enters the fluid reservoir 31 of the planter shelf 10 when a signal to the electronic faucet 78 directs the electronic faucet 78 to open. A pipe 32 extension can be coupled to the electronic faucet 78 to avoid irrigation fluid 35 splattering. The power to the electronic faucet 78 can be received by a power/data conductor 70 that runs below the header panel 6 concealed inside a recess/protrusion 27 mechanical key 11 coupling the header panel 6 to the planter shelf 10.

The power/data conductor 70 that is coupled to the electronic faucet 78 can couple to a plurality of electronic faucets 78 downstream, wherein each electronic faucet 78 is dedicated to at least one subset section of the cultivation wall 25. The power and data conductor 70 can also be coupled to other electronic devices 86 coupled to the cultivation wall 25 system. For example, a concealed continuous lighting source 75 can be disposed inside the mechanical key 11 recess and be powered by the power/data conductor 70 (not shown in the figure). The electronic devices 86 of the cultivation system 25 can have at least one way communication by wire or wireless.

The present figure shows inside the fluid reservoir 31 a plant brick 51 root retaining matrix 50 being partially submerged in irrigation fluid 35. The fluid 35 level inside the fluid reservoir 31 can be controlled by the irrigation controller 83. In a different embodiment (not shown) electronic faucets 78 and/or valves 79 can be coupled to a plurality of the planter shelves 10.

FIG. 15C shows a worm eye perspective view of the header panel 6 coupled to the planter shelf 10 wherein both are disposed inside the flanges 3 of a vertical post 1. The header panel 6 is shown partially filled with irrigation fluid 35. Fluid 35 to the header panel 6 is delivered through the web 2 of a vertical post 1 to the top planter shelf 10 disposed below the header panel 6. The fluid 35 is conveyed to the header panel 6 by a coupler pipe 34 coupled at one end to a reciprocating connector at the web 2 of the vertical post 1 and another reciprocating connector at the bottom of the header panel 6. Below, an electronic faucet 78 is shown coupled to at least one of: the header panel 6 and the planter shelf 10. The electronic faucet 78 is coupled to a pipe 32 extension that directs fluid 35 dispensed by the electronic faucet 78 to the fluid reservoir 31 of the planter shelf 31. A power/data conductor 70 conveying power and/or data from across the web 2 of the vertical post 1 energizes and/or communicates with the electronic faucet 78.

The coupler pipe 34, the power/data conductor 70 and the electronic faucet 78 can be concealed from view by a pipe/power/data cover 14 adapted to be coupled to the web 2 of the vertical post 1 in proximity to the top wall flange 19 of the planter shelf 10. The same cover can be placed at the opposite end of the top planter shelf 10.

Figure 16B:
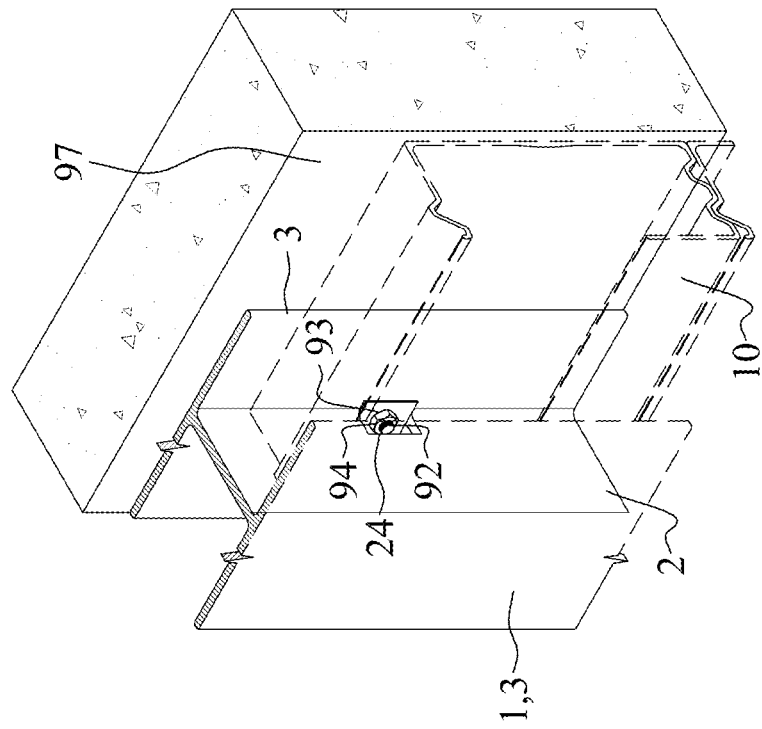
FIGS. 16A and 16B show an elevation and partial perspective of a post with a bore configured to be supported by a vertical structure.
Figure 16A:
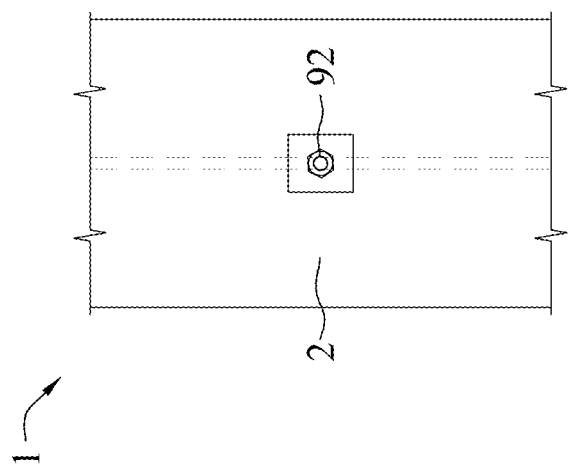

FIGS. 16A and 16B show an elevation and partial top perspective of a post 1 configured to retain within its flanges 3 a plant cultivation wall 25 that is coupled to a vertical structure. The post 1 as such has the same overall design as that previously discussed above and which is intended to be part of the modular cultivation wall 25 disclosed in FIG. 1.

FIG. 16A shows a side elevation of a partial section of the post 1. The elevation shows the one of the post's flanges 3 with a bore 24 centered between the horizontal ends of the flange 3. In this embodiment, the horizontal center of the flange 3 co-aligns with the horizontal center of the post's web 2. A threaded bolt 92 protruding from the vertical structure 97, couples to the pressure plate 93 and secures a portion of the cultivation wall 25 to the vertical structure 97 by at least one nut 94.

FIG. 16B shows a partial perspective of the post 1 with an opening 24 in its web 2 and a through bolt 92 coupled to a pressure plate 93 and a nut 94 secure the post 1 to a vertical structure 97.

Centering the bolt 92 with the post web 2 does not interfere with placing planter shelves 10 and/or panels 6, 7, 8 between the posts' webs 2. The planter shelves 10 and/or the panels 6, 7, 8 disposed between the flanges 3 of the posts 1 then can carry their vertical loads to the retaining surface's 98 below. In another embodiment the weight of the above cultivation wall 25 assembly can rest on a bottom mounted beam that is coupled to the posts 1 transferring the load to the bolts 92 of the vertical structure 97.

The invention may according to a first alternative aspect be defined as given below:

A planter shelf assembly comprising at least one of: an elongated planter shelf, a seed and/or plant retaining root matrix, a pipe and two elongated and vertically disposed posts, wherein;

the two vertical posts, each having at least one web and two flanges are set apart, anchored to at least one surface with the ends of an elongated planter shelf disposed between the flanges of each of the two posts;

the elongated planter shelves are further comprised of at least one of: a full height side wall, a short side wall, an endcap wall, a top wall flange, and a bottom wall flange;

the planter shelf is vertically oriented with outside facing lateral openings on one or both sides where both sides' arrangement can share a common full height web wall;

two endcap walls disposed inside or on the opposite ends of the elongated planter shelf are coupled to the bottom wall flange, the top wall flange, the full height side wall and the short side wall, to define a fluid irrigation reservoir that opens to the above with at least one through opening in the bottom wall flange to the below;

at least one seed and/or plant retaining matrix is coupled to at least one interior surface of the planter shelf and is irrigated from above or from below; and piped fluid received at the fluid irrigation reservoir through a web in a first post is piped through a web in a second post disposed at opposite sides of the planter shelf to another fluid irrigation reservoir or drained to the below through at least one through opening in the bottom surface of the fluid irrigation reservoir.

The invention may according to a second alternative aspect be defined as given below:

An irrigation method of a planter shelf assembly comprising at least one of: an elongated planter shelf, an elongated header panel, an elongated base panel, a seed and/or plant retaining root matrix, a fluid sensor, an electronic faucet communicatively coupled to a microprocessor, a transceiver, and two elongated and vertically disposed posts, wherein:

the two vertical posts, each having at least one web and two flanges set apart, are anchored to at least one retaining surface and the ends of an elongated base panel are disposed between the flanges of each of the two posts;

opposing planter shelf ends of an elongated planter shelf are disposed between the flanges of the same two posts, whereby the planter shelf is coupled to the base panel from above;

optionally disposing additional planter shelves between the flanges of the same posts, whereby the additional planter shelves couples to each other in a stacked manner from above;

the opposing ends of an elongated header panel are disposed between the flanges of the same two posts, whereby the header panel couples from above to an upper most planter shelf; and wherein;

irrigation fluid is arranged to flow by gravity from the header panel to a bottom mounted planter shelf with at least one seed and/or plant retaining root matrix arranged thereto, to a base panel or through the bottom mounted planter shelf to a base panel; and the fluid flow inside the at least one planter shelf is controlled by at least one microprocessor coupled to at least one of: a fluid sensor, an electronic faucet, and a transceiver that communicatively couples the header panel to a bottom mounted planter shelf and/or the base panel.

The invention may according to a third alternative aspect be defined as given below:

A modular vertical cultivation wall system comprising: at least two posts, at least two planter shelves, at least two endcaps walls, and at least one of a pressurized pipe, a seed/plant root retaining matrix, and irrigation fluid, wherein:

each post is elongated, vertically anchored to at least one retaining surface and comprises at least one web and at least two flanges;

each planter shelf is elongated and comprises at least one of: a top wall flange, a bottom wall flange, a full height side wall connecting the top wall flange and the bottom wall flange, and a short side wall;

the opposing ends of a first horizontally oriented planter shelf are disposed between the at least two flanges of each of the two vertical posts;

the opposing ends of a second horizontally oriented planter shelf are disposed between the at least two flanges of each of the two vertical posts retaining the first planter shelf, and wherein and the at least two planter shelves are configured to slide downwardly into a position in which the bottom wall flange of the second planter shelf couples with the top wall flange of the first planter shelf by at least one reciprocating mechanical key;

endcaps' walls coupled to a top surface of the bottom wall flange at both ends of the first and second planter shelves and to their side walls define a fluid irrigation reservoir that is open to the above with at least one opening to the below;

a pipe with at least one fluid emitting nozzle disposed inside the fluid irrigation reservoir extends the approximate length of the planter shelf and is coupled to a first post web disposed at one end of the planter shelf and a second post web disposed at the opposite end of the planter shelf, wherein:

pressurized irrigation fluid received through the first post web is in part dispensed through the at least one fluid emitting nozzle with the remainder of the fluid configured to flow through the second post web to at least another planter shelf fluid irrigation reservoir;

the dispensed fluid is configured to irrigate from above or below at least one seed/plant root retaining matrix that is configured to be coupled to at least one of: a fluid irrigation reservoir and a wall of a planter shelf; and the weight of the at least two planter shelves alone, or in combination with at least one base panel, wall panel or header panel is configured to be directed to a below retaining surface substantially without applying vertical loads on the at least two posts The invention may according to a fourth alternative aspect be defined as given below:

A modular vertical cultivation wall system comprising: at least two posts, at least two planter shelves, at least two endcaps walls, and at least one of: a pipe, a seed/plant root retaining matrix, and irrigation fluid, wherein:

each posts is elongated, vertically anchored to at least one retaining surface and comprises at least one web and at least two flanges;

each planter shelf is elongated and comprises at least one of: a top wall flange, a bottom wall flange, a full height side wall connecting the top wall flange and the bottom wall flange, and a short side wall;

the opposing ends of a first horizontally oriented planter shelf are disposed between the at least two flanges of each of the two vertical posts;

the opposing ends of a second horizontally oriented planter shelf are disposed between the at least two flanges of each of the two vertical posts retaining the first planter shelf, and wherein and the at least two planter shelves are configured to slide downwardly into a position in which the bottom wall flange of the second planter shelf couples with the top wall flange of the first planter shelf by at least one reciprocating mechanical key;

endcaps' walls coupled to a top surface of the bottom wall flange at both ends of the first and second planter shelves and to their side walls define a fluid irrigation reservoir that is open to the above with at least one opening to the below; wherein:

a pipe coupled to a first web of one of the posts extends the approximate length of a planter shelf, receives, and dispenses pressurized irrigation fluid above at least one seed and/or plant root retaining matrix and then couples to a web of a second post configured to convey fluid to at least one more planter shelf;

the fluid dispensed irrigates from above the at least one seed/plant root retaining matrix, drains from the bottom of the at least one seed/plant root retaining matrix, and exits the fluid irrigation reservoir through the at least one opening to the below; and, the weight of at least two planter shelves alone, or in combination with at least one base panel, wall panel or header panel is configured to be directed to a below retaining surface substantially without applying vertical loads on the at least two posts The invention may according to a fifth alternative aspect be defined as given below:

A plant cultivation wall planter assembly comprising at least one of: an elongated planter shelf, a seed and/or plant retaining root matrix, a door/access panel, an irrigation system, a chase enclosure, a pipe, and at least three elongated and vertically disposed posts, wherein;

each of the three vertical posts, have at least one web and two flanges set apart, is anchored to at least one retaining surface with the opposing ends of at least one elongated planter shelf disposed between the flanges of a first and a second vertical posts;

the third vertical post is aligned with the first and second vertical posts and is disposed in proximity to at least one of the first or second vertical posts;

an irrigation system is disposed in a chase enclosure formed by the at least third vertical post and another vertical post having at least one access/door panel disposed between;

the planter shelf is vertically oriented with outside facing lateral openings on one or both sides and the cultivation wall comprising the planter shelves can extend outwardly from at least two sides of the chase enclosure; and wherein at least one seed and/or plant retaining matrix is coupled to at least one interior surface of the planter shelf and is irrigated from above or from below; and fluid originating from at least one of: the chase enclosure irrigation system and a remote location through a chase enclosure is received inside at least one planter shelf through a first web post and piped through a second web post disposed at opposite sides of the planter shelf to at least one other planter shelf.

The major part of the embodiments disclosed in the drawings disclose a single-sided wall. This is for facilitate the understanding. The disclosed principles are equally applicable to a double-sided wall. In the event of a double-sided wall, both sides may be provided with cultivation material or one side may be provided with cultivation material and the other side may be provided with other type of material, e.g. sound attenuation panels. Also, one and the same side of a wall may be provided with a mixture of cultivation material and other types of materials or panels having different properties.

The skilled person realizes that a modular wall according to the invention along its full length with several sections arranged side by side may be provided with sections with cultivation material and sections with other properties/material depending on the users choice. The skilled person realizes that the modular wall as described throughout the document may be combined with any of the irrigation systems or irrigation methods described and illustrated in the document. Thus, all modules and methods described are interchangeable with each other.

The document describes a number of possible irrigation methods. The different methods may in full or in part be combined with each other. Also, one and the same wall may be provided with a combination of different irrigation methods. Thus, a modular vertical cultivation wall system has been disclosed which allows a versatile design by combining a number of modules and a number of different irrigation systems and irrigation methods at the users choice.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in the light of the teachings above without departing from the spirit and scope of the forthcoming claims.

The invention claimed is:

1. A modular vertical cultivation wall system comprising:
   two vertical posts;
   two planter shelves;
   two endcaps walls; and
   at least one of a pipe, a seed/plant root retaining matrix, and irrigation fluid,
   wherein:
      each post of the two vertical posts is elongated, vertically anchored to at least one retaining surface and comprises at least one web and at least two flanges,
      each planter shelf is elongated and comprises at least one of a top wall flange, a bottom wall flange, a full height side wall connecting the top wall flange and the bottom wall flange, and a short side wall,
      opposing ends of a first horizontally oriented planter shelf are disposed between the at least two flanges of each of the two vertical posts,
      opposing ends of a second horizontally oriented planter shelf are disposed between the at least two flanges of each of the two vertical posts retaining the first planter shelf, the at least two planter shelves are configured to slide downwardly into a position in which the bottom wall flange of the second planter shelf couples with the top wall flange of the first planter shelf by at least one reciprocating mechanical key,
      respective of the two endcaps walls are coupled to a top surface of the bottom wall flange at both ends of the first planter shelf and the second planter shelf and to associated side walls thereof to define a fluid irrigation reservoir that is open to above and with at least one opening to below,
      the fluid irrigation reservoir of a particular planter shelf of the two planter shelves receives piped fluid, directly or indirectly, through an opening in a web of one of the two vertical posts and the piped fluid exits the fluid irrigation reservoir as dispensed fluid through at least one opening in a bottom wall of the fluid irrigation reservoir,
      a flow of the dispensed fluid irrigates from above or below at least one seed/plant root retaining matrix that is configured to be coupled to at least one of a bottom wall flange defining the fluid irrigation reservoir or the full height side wall of a planter shelf of the two planter shelves, and
      a weight of the two planter shelves alone, or in combination with at least one base panel, wall panel or header panel is directed to a below retaining surface substantially without applying vertical loads on the two vertical posts.

2. The system according to claim 1, further comprising another vertical post, the another vertical post and the two vertical posts being three posts that are arranged side by side, wherein a first sub-set of planter shelves are supported by a first post and a second post of the three posts, and wherein a second sub-set of planter shelves are supported by the second post and a third post of the three posts.

3. The system of claim 2, wherein the first sub-set of planter shelves is positioned to permit a fluid flow to the second sub-set of planter shelves through an opening in the web of a common post of the three posts.

4. The system according to claim 1, wherein the top wall flange, the bottom wall flange, the full height side wall that connects the top wall flange and the bottom wall flange, and the short side wall collectively provide the planter shelf with a substantially C-shaped cross section.

5. The system of claim 1, wherein the seed or plant root matrix is configured to be irrigated by irrigation fluid by at least one of capillary action or saturation.

6. The system of claim 1, wherein the system includes a length of a pressurized pipe having an approximate length of at least two planter shelves.

7. The system of claim 6, wherein the pressurized pipe is disposed inside a recess formed by a mechanical key of a planter shelf.

8. The system of claim 1, wherein at least one of the planter shelves or the two vertical posts of the cultivation wall system is non-corrosive and made of other than metal and cement material.

9. The system of claim 1, wherein at least one of the planter shelves or the two vertical posts of the cultivation wall system is made of at least 35% fibrous material.

10. The system of claim 1, wherein a longitudinal length of the planter shelf is greater than 250 times a thickness of the full height side wall as measured at a narrowest location thereof.

11. The system of claim 1, wherein at least one of a power conductor or a data conductor is coupled to at least a portion of the two planter shelves.

12. The system of claim 1, wherein a wall of the fluid irrigation reservoir comprises at least one valve configured to facilitate at fluid ingress and/or fluid egress to the fluid irrigation reservoir of a planter shelf of the two planter shelves.

13. The system of claim 1, wherein the cultivation wall system comprises at least one controller configured to regulate at least one of the fluid ingress to a planter shelf of the two planter shelves or a recirculation of fluid drained from the planter shelf of the two planter shelves.

14. The system of claim 13, wherein drained planter shelf irrigation fluid collected by a first base panel is urged to flow by an irrigation system to another base panel for recirculation as recirculated fluid.

15. The system of claim 14, wherein the recirculated fluid is at least filtered and/or irradiated.

16. The system of claim 1, wherein the cultivation wall system comprises circuitry that includes: a sensor, a pump, a processor, a power generator, a power storage structure, a transceiver, and an output, and wherein the circuitry is coupled to at least one of a planter shelf of the two planter shelves, a post of the two vertical posts, a base panel, a header panel or a chase enclosure.

17. The system of claim 1, wherein at least a portion of the seed and/or plant root retaining matrix of a planter shelf is protected from moisture penetration by nonporous material.

18. A method of providing a modular vertical cultivation wall, the method comprising:

vertically anchoring at least two posts to at least one retaining surface, each of the at least two posts comprising at least one web and at least two flanges;

providing a plurality of elongated planter shelves, each elongated planter shelf comprising at least one of a top wall flange, a bottom wall flange, a full height side wall that connects the top wall flange and the bottom wall flange, a short side wall, and two end cap walls, such that the full height side wall, the bottom wall flange, the short side wall together with the two end cap walls together define a fluid irrigation reservoir that is open to above and with at least one opening to below;

vertically disposing the plurality of elongated planter shelves one on top of another with opposing ends of each planter shelf being disposed between the at least two flanges of two subsequent posts, such that the bottom wall flange of a second planter shelf is positioned to be coupled with the top wall flange of the first planter shelf by at least one reciprocating mechanical key;

arranging at least one seed/plant root retaining matrix in the plurality of elongated planter shelves; and connecting a pipe configured to dispense piped fluid, directly or indirectly, to the fluid irrigation reservoir of a planter shelf, such that the dispensed fluid is free to enter an opening in a web of a first vertical post at one end of the planter shelf, and dispensed fluid is free to exit the irrigation reservoir through at least one opening in the fluid reservoir to below and/or through an opening in a web of a second vertical post at the opposite side of the planter shelf, and wherein the dispensed fluid is available to irrigate from above or from below to the at least one seed/plant root retaining matrix.

19. A modular vertical cultivation wall system comprising:

two vertical posts, each post of the two vertical posts is elongated, vertically anchored to at least one retaining surface and comprises at least one web and at least two flanges;

two planter shelves, each planter shelf of the two planter shelves is elongated and comprises at least one of a top wall flange, a bottom wall flange, a full height side wall connecting the top wall flange and the bottom wall flange, and a short side wall, opposing ends of a first horizontally oriented planter shelf of the two planter shelves are disposed between the at least two flanges of each of the two vertical posts, opposing ends of a second horizontally oriented planter shelf of the two planter shelves are disposed between the at least two flanges of each of the two vertical posts retaining the first planter shelf, the at least two planter shelves are positioned to slide downwardly into a position in which the bottom wall flange of the second planter shelf couples with the top wall flange of the first planter shelf by at least one reciprocating mechanical key;

two endcaps walls, respective of the two endcaps walls are coupled to a top surface of the bottom wall flange at both ends of the first planter shelf and the second planter shelf and to associated side walls thereof to define a fluid irrigation reservoir that is open to above and with at least one open to below;

at least one of a pipe, a seed/plant root retaining matrix, and irrigation fluid, wherein the fluid irrigation reservoir of a planter shelf receives piped fluid, directly or indirectly, through an opening in a web of one of the two vertical posts and the piped fluid exits the fluid irrigation reservoir as dispensed fluid through at least one opening in a bottom wall of the fluid irrigation reservoir; and means for irrigating at least one seed/plant root retaining matrix coupled to at least one of a bottom wall flange with the dispensed fluid, or with fluid previously drained from the plant shelf, wherein a weight of the two planter shelves alone, or in combination with at least one base panel, wall panel or header panel is directed to a below retaining surface substantially without applying vertical loads on the two vertical posts.

\* \* \* \* \*